United States Patent [19]

Koser

[11] Patent Number: 4,497,221
[45] Date of Patent: Feb. 5, 1985

[54] VARIABLE GEAR TRANSMISSION SYSTEM

[76] Inventor: Manfred Koser, Untere Inntalstr. 17, D-8398 Pocking 2-Hartkirchen, Fed. Rep. of Germany

[21] Appl. No.: 386,643

[22] Filed: Jun. 9, 1982

[30] Foreign Application Priority Data

Jun. 4, 1982 [DE] Fed. Rep. of Germany ....... 3221236

[51] Int. Cl.³ .................. F16H 3/44; F16H 57/10; F16H 1/28
[52] U.S. Cl. ........................................ 74/793; 74/803
[58] Field of Search ............... 74/681, 689, 203, 750, 74/793, 796, 803; 474/8, 31, 72

[56] References Cited

U.S. PATENT DOCUMENTS

| 1,753,784 | 4/1930 | Herzog | 74/793 |
| 2,170,733 | 8/1939 | Sharpe | 74/803 X |
| 2,490,525 | 12/1949 | Koller | 74/796 |
| 3,015,972 | 1/1962 | Voigt | 74/793 |
| 3,589,212 | 6/1971 | Marcus | 74/793 |

FOREIGN PATENT DOCUMENTS

| 354259 | 12/1979 | Austria . | |
| 452654 | 11/1948 | Canada | 74/681 |
| 44575 | 8/1931 | Denmark | 74/803 |
| 438493 | 12/1926 | Fed. Rep. of Germany | 474/31 |
| 650077 | 8/1935 | Fed. Rep. of Germany . | |
| 1650817 | 12/1970 | Fed. Rep. of Germany | 74/681 |
| 483278 | 6/1917 | France . | |
| 804206 | 10/1936 | France | 74/681 |
| 973702 | 2/1951 | France | 74/681 |
| 2367955 | 12/1978 | France . | |
| 414289 | 7/1946 | Italy | 74/803 |
| 477471 | 1/1953 | Italy | 74/796 |
| 161130 | 4/1933 | Switzerland | 74/796 |

Primary Examiner—George H. Krizmanich
Assistant Examiner—Dirk Wright
Attorney, Agent, or Firm—Ostrolenk, Faber, Gerb & Soffen

[57] ABSTRACT

Variable toothed gear transmission system with at least one toothed gear with a variable number of teeth.

11 Claims, 42 Drawing Figures

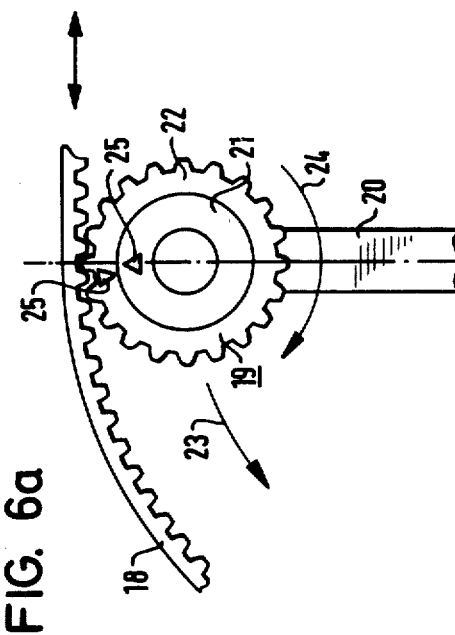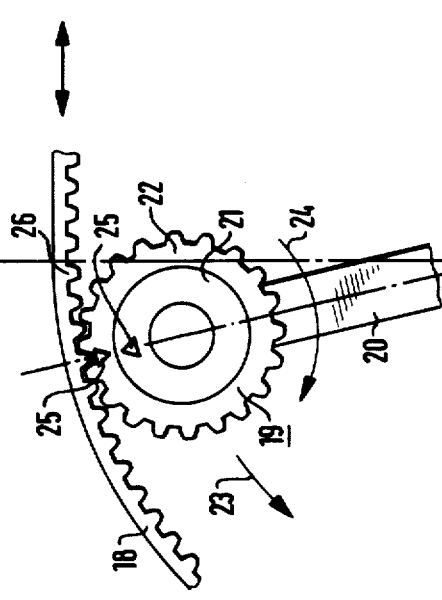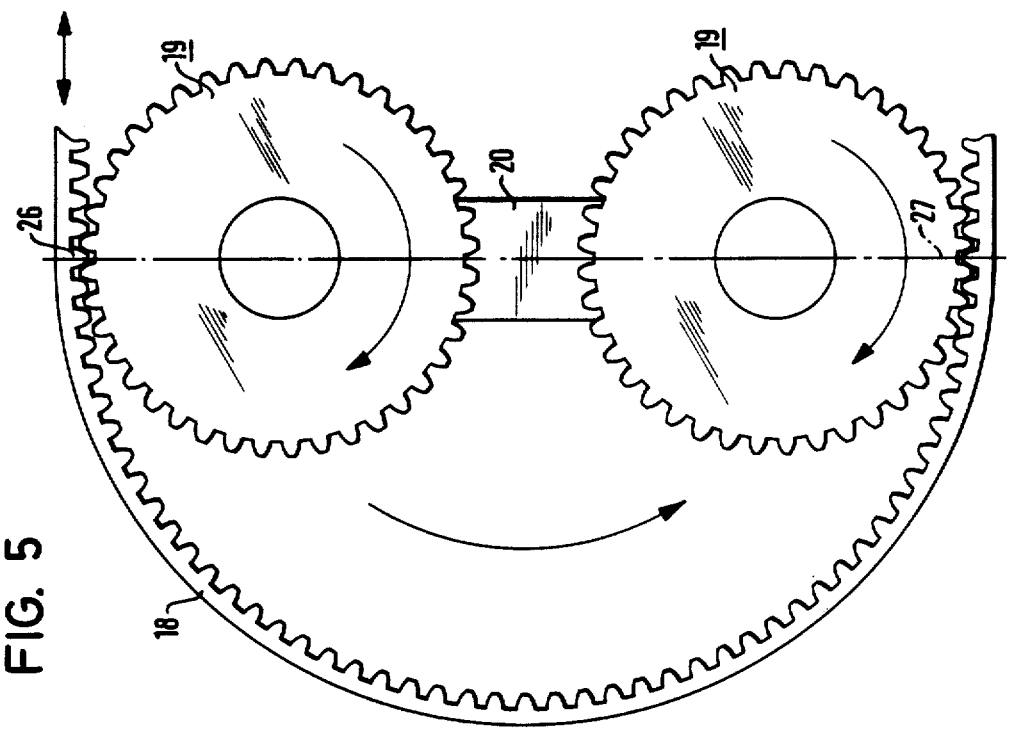

FIG. 23a
FIG. 23b
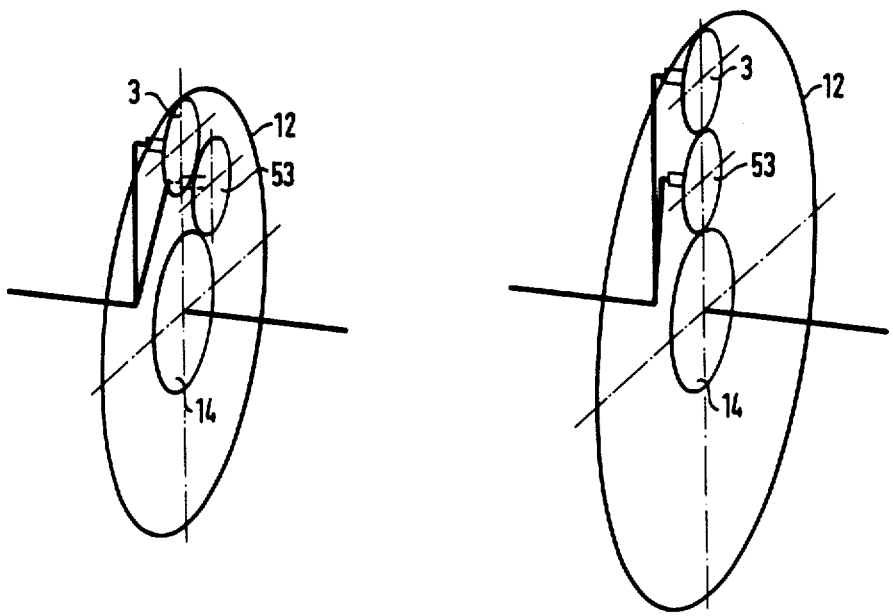
FIG. 24
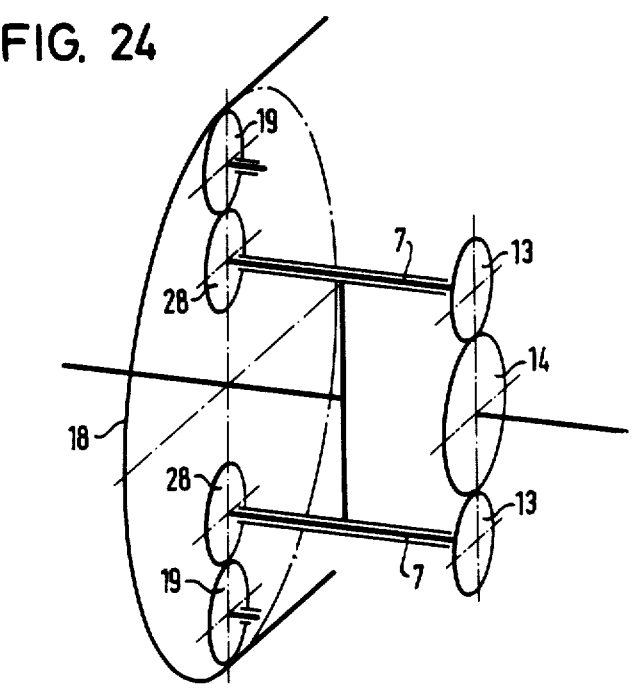

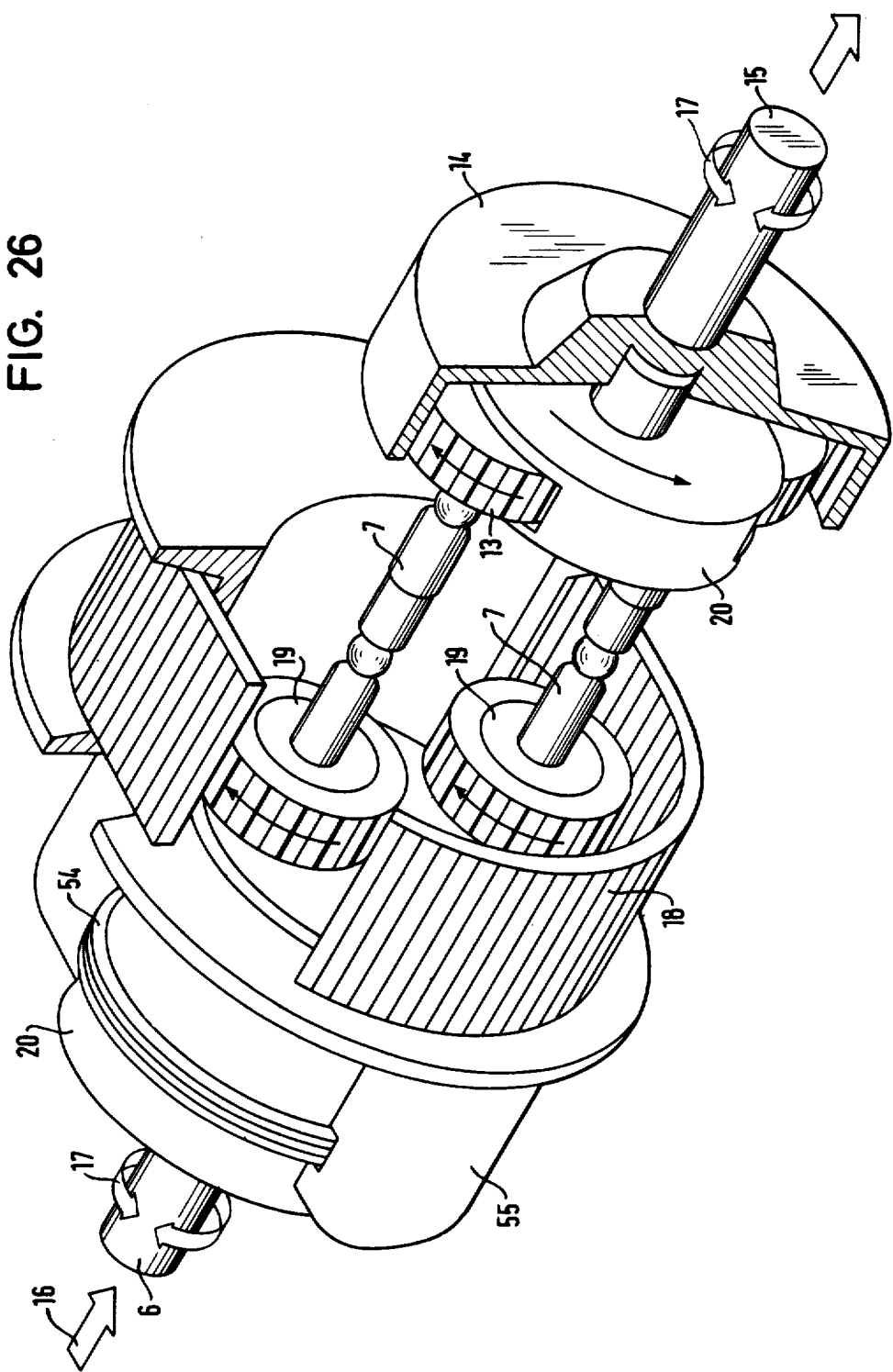

VARIABLE GEAR TRANSMISSION SYSTEM

BACKGROUND OF THE INVENTION

The invention concerns a variable gear transmission system that can be employed to advantage in vehicles and other machines, especially those that incorporate internal combustion engines.

Variable gearing is intended, subject to energy consumption and ease of operation, both to adapt motor torque to the forces being demanded and to operating conditions and, as the transmission in a vehicle, to improve acceleration and deceleration.

STATE OF THE ART

Ordinary gearshifts are now being mainly employed for this purpose in vehicles, although what are called automatic converters are used to some extent, and occasionally automatic competition systems or semiautomatic systems are utilized. In a few cases, continuous drives and purely hydrodynamic or electrodynamic torque converters are employed.

Such power-transmission systems, however, fulfill their intended purpose only imperfectly. Gearshifts have wide gaps between their individual ratio stages, suffer losses through the clutch, and are more trouble to operate than other power-transmission systems. The presently prevailing automatic converter is in no way completely automatic, especially because it decelerates inversely, specifically by lifting when the accelerator pedal is released, instead of by being depressed, and attains, like other easy-to-operate power-transmission systems, its operationally desirable automatic performance as a rule only at the expense of efficiency.

PURPOSE OF THE INVENTION

The invention is intended to be a variable gearing system that is not only maximally efficient, which can be achieved only with gears, but also allows torque to be adjusted in a manner similar to that employed in infinitely variable gearing systems, so that acceleration can occur at maximal engine performance, and that allows both the utilization of control characteristics compatible with the most up-to-date technologies, like computers, and genuinely full automation accompanied by maximum ease of operation.

DESCRIPTION OF THE INVENTION

This purpose is achieved because the variable gearing system in accordance with the invention has at least one gears with a variable number of teeth. This gears will be called the "control wheel."

The control wheel eliminates the need for complicated gears shifting combinations to alter the gear ratio or to achieve a maximal variety of gear ratios. The gear ratio of the system can be altered by simply varying the number of teeth on the control wheel. Only two control operations, one positive and one negative, are necessary in fact to alter the gear ratio: increasing or decreasing the number of teeth.

A variable gear transmission system that incorporates a control wheel in accordance with the invention will be called a "digital gearing system." Such a system can be designed either as a multistage, rapid-shift mechanism with continuously variable characteristics or as a strictly continuously variable device.

The variable cogwheel gearing system in accordance with the invention will preferably be designed so that the control wheel will have a link chain or link belt and a tensioning device that imposes a section of the chain or belt on a cogwheel and that has a variable effective imposition radius. Such a system will allow the control wheel to be very simple in design, and the number of its teeth can be varied simply by introducing links into or removing them from the effective imposition radius of the chain or belt.

It will be especially preferable for the variable gear transmission system in accordance with the invention to be a planetary gearing system with a fixed control wheel, around which a particular type of plant wheel that will be called a "scanner wheel" revolves. The fixed control wheel may be either a sun wheel or a ring wheel. A fixed control wheel is relatively simple to build, while a rotating control wheel would be comparatively expensive.

This type of design in itself represents the simplest embodiment of such a digital gearing system, with the scanner wheel mounted in and radially guided by a pinion cage on a shaft and with the axis of the scanner wheel connected to the cardan shaft. One of the two shafts, either the pinion-cage shaft or the cardan shaft, will then constitute the input shaft and the other the output shaft, depending on whether speed is being increased or reduced.

Another embodiment of the invention incorporates a second plant wheel that is coupled, preferably axially, to the scanner wheel and that engages still another gears. This second planet wheel will be called a "synchronic wheel" because it rotates synchronically with the scanner wheel. The other gears will be called a "differential wheel."

Another preferred embodiment of the invention may have one or more secondary scanner wheels between the main scanner wheel and the synchronic wheel or one or more synchronic wheels serving as a secondary scanner wheel. In such cases the main scanner wheel will be called a "primary scanner wheel." The special advantage of such an embodiment is that it allows a wider range of gearing, with the second version alow providing a gearing system that is very compact axially.

The link chain or link belt can be continuous and mounted over a countertensioning device that operates synchronically with but in the opposite direction to the tensioning device, with links being introduced into and removed from the effective imposition radius in a direction that parallels the rotation of the scanner wheel. The special advantage of this embodiment is that the countertensioning device always excepts the exact number of links in the chain or belt that are released by the tensioning device and vice versa. A control wheel that incorporates both a tensioning and a countertensioning device will be called a "proportional control wheel." It has idling guides between the two tensioning devices that ensure that the links are introduced and removed in the above-mentioned direction of rotation. This introduction-and-removal device will ensure that the link chain or link belt will always move only in the direction in which the scanner wheel rotates while links are being introduced or removed, which means in turn that only slight shifting forces are required to introduce and remove them.

The link chain may specifically be a roller chain or inverted toothed chain stretched over conical tensioning jaws on the tensioning and countertensioning devices. The jaws can be adjusted to extend or shorten the section of the link chain within their effective radius.

Another embodiment of the invention is distinguished by a control-wheel engagement area that is an arc of a circle and by several synchronized scanner wheels that always engage the meshing area one at a time. A significant advantage of this embodiment is that considerably stronger link chains or link belts can be used with the control wheel because they will be introduced into the effective radius in a straight line rather than, as in the previously described embodiment with its closed control wheels, at an angle, which allows the use of flexible toothed steel belts as link belts.

Whereas, in the embodiment previously described, only one link at a time can be introduced into or removed from the effective radius during the time it takes the scanner wheel to revolve once around the control wheel, the embodiment just described allows the introduction or removal of a link to take any time at all if in accordance with a further embodiment of the invention the teeth on the scanner wheels can be resiliently set synchronically with the teeth on the control wheel.

An "open" control wheel, with an engagement area that extends only over an arc of a circle, will also allow twice as many gear ratios if, in accordance wih another embodiment of the invention, the teeth on the scanner wheel can be set synchronically with those on the control wheel at an interval of half a tooth so that only half a tooth will be introduced into or removed from the effective imposition radius at a time.

It is even possible when the control wheel is open to make the gear ratio constantly variable because the teeth on the scanner wheel can be set constantly synchronically with those on the control wheel. Constant synchronization can be achieved not only with appropriate mechanical means but also electronically (an infinitely variable system).

No matter what particular embodiment of the gearing system in accordance with the invention is employed, electronic controls can be used to vary its power-transmission ratio. Such controls can be switched with a device that will preferably be a selector lever into neutral, forward, or reverse, and the accelerator pedal will, in forward and reverse, function through specially supplied electronic controls as both a standard-speed generator and acceleration plus engine-brake controls, whereas in neutral it will affect the engine directly. This will result in a fully automatic power-transmission system of a type that is absolutely unavailable as yet at state of the art and that will provide the advantage of shifting into a lower gear when the accelerator pedal is released, in contrast to the inverse performance of the previously mentioned automatic converters now available, so that the accelerator pedal will function on the whole like continuously variable controls.

To provide smooth startoffs with multiple-gear rapid-start systems with high and low transmission stages, the gearing system in accordance with the invention can be provided with a front-to-rear ratio by mounting it in series with a torsionally elastic connection that can also serve in conjunction with a rigidly mounted instrument as an rpm and load pickup to simplify control of the system when conditions permit.

The gearing system in accordance with the invention can also be mounted in series with a hydrodynamic clutch or torsion converter, both of which can be activated essentially only during shifting. This will also promote smooth startoffs and provide a continuous transition between the individual transmission stages when a torque converter is employed.

BRIEF DESCRIPTION OF THE DRAWINGS

The invention will now be specified with reference to some of its preferred embodiments illustrated in the drawings, in which FIG. 5 is a partial view, showing essentially only the control wheel and the scanner wheels, of a fourth embodiment of the invention in which the effective meshing section of the control wheel is only an arc of a circle and that incorporates two synchronically rotating scanner wheels, FIG. 6a, b illustrates the operation of a resilient scanner wheel, with b also illustrating that of a scanner wheel that can be set over a distance of half a tooth or that synchronizes continously, FIG. 24 illustrates an embodiment of the system that combines the design principles of FIGS. 2a–c and 23a, b.

FIG. 26 is a perspective view of a gearing system in accordance with the invention and with an open control wheel that can incorporate the types of embodiment specified with reference to FIGS. 5 through 7c.

SPECIFICATION OF THE INVENTION

Figure 1:
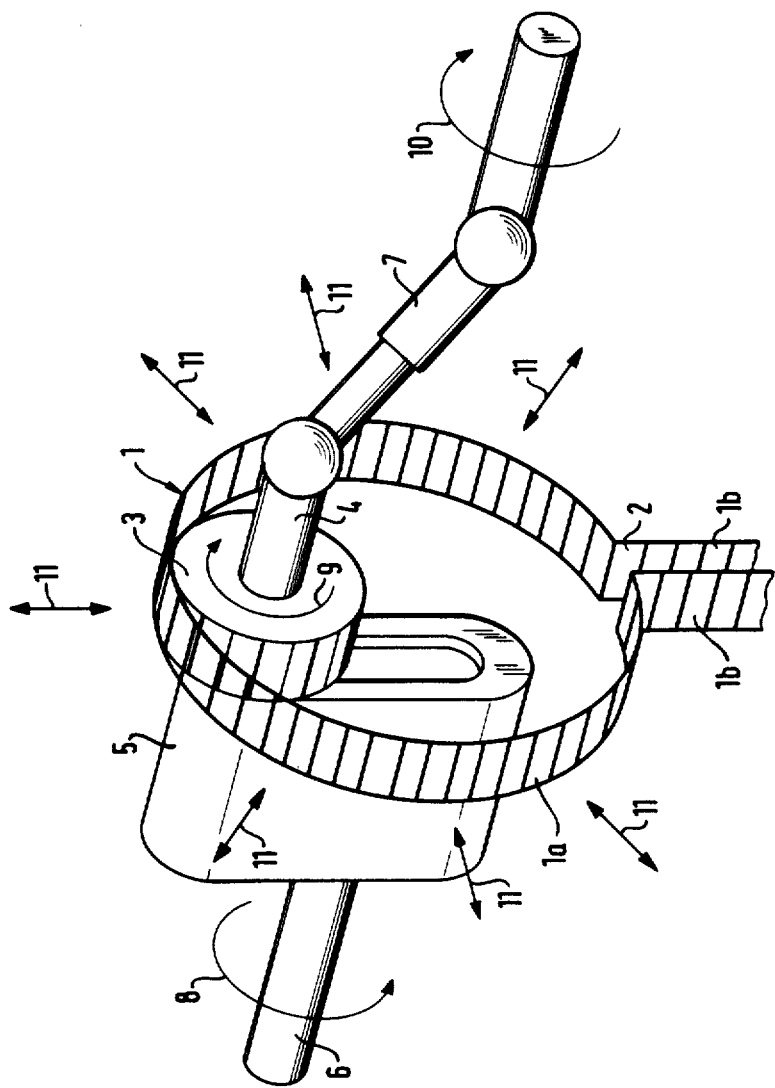
FIG. 1 is a perspective view of one, especially simple, embodiment of a variable gear transmission system in accordance wih the invention.

FIG. 1 illustrates an especially simple embodiment of a variable gear transmission system in accordance with the invention in which only the link chain 1, which may also be a link belt, of the control wheel, a gear with a variable number of teeth, is shown. Link chain 1 is connected to a gear by a tensioning device that is not illustrated in FIG. 1 and thus consists of a round annular section 1a imposed on the gear and of connected sections 1b located outside the effective radius. Links of sections 1b outside the effective imposition radius, meaning round and annular section 1a, can be introduced into it to increase the number of teeth on the wheel, and links of section 1a within the effective radius can be removed from it to decrease the number. Point 2, at which links are introduced into or removed from round and annular section 1a, is considered here to be a guide channel.

Around the fixed control wheel revolves a scanner wheel 3 in the form of a planet wheel with a shaft 4 that is mounted in such a way as to rotate and slide radially in a pinion cage 5 that merges on the side facing away from scanner wheel 3 into a main planetary shaft 6. On the other side of scanner wheel 3 its shaft 4 is connected to a telescopic cardan shaft 7.

Links can be introduced into or removed from section 1a with only one of the two sections 1b, which is considered here to be a monochain guide. The two sections 1b can also be connected at the ends facing away from section 1a so that the whole chain or belt will form a continuous chain or belt 1. In this case a peripheral chain guide will be provided and the links will be introduced into the effective radius on one side and removed from it on the other side in the same sense as pinion cage 5 rotates.

Guide channel 2, the gap between the initial and final link of section 1a, will preferably be exactly as wide as a single link, although it may also be as wide as several links if the rotation of the scanner wheel is ensured by individual intermediate links.

If power is applied in this gearing system to main planetary shaft 6, scanner wheel 3 will be directed around section 1a and will accordingly provide an opposite rotation to the tooth ratio through the cardan shaft as indicated by arrows 8, 9, and 10.

If power is applied to cardan shaft 7, scanner wheel 3 will roll backwards along section 1a and provide a counterrevolution through pinion cage 5.

If the control wheel, which consists in this case of section 1a, now alters its diameter, as indicated by double-headed arrows 11, the transmission ratio will now change in accordance with the tooth ratio between section 1a and scanner wheel 3. This toothed shifting process occurs without a clutch within the time it takes pinion cage 5 to rotate once, while scanner wheel 3 will not be in the vicinity of guide channel 2.

Figure 2A:
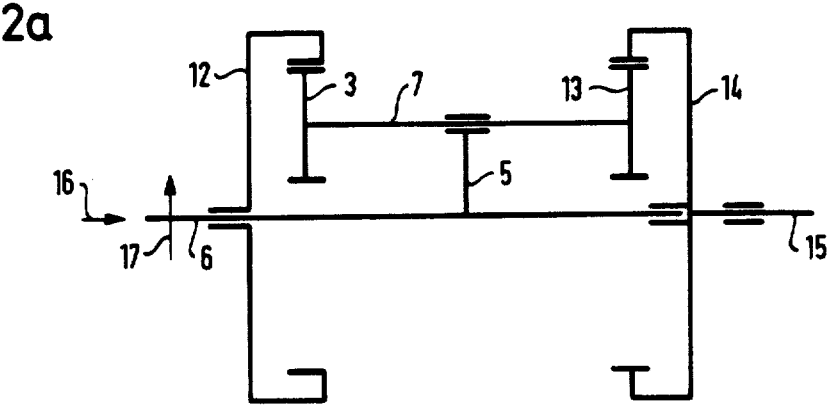
FIG. 2a–c is a schematic representation of another embodiment of a system in accordance with the invention at various states of rotation.
Figure 2B:
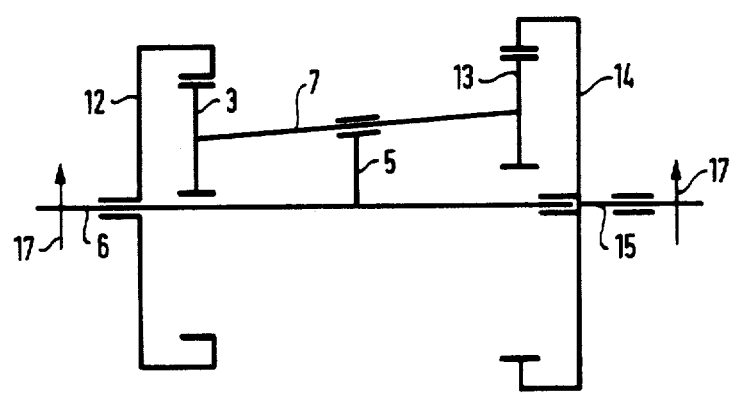
Figure 2C:
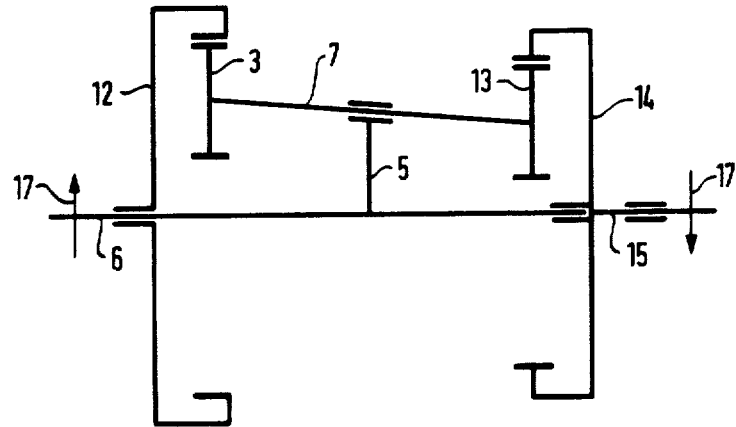
Figure 25:
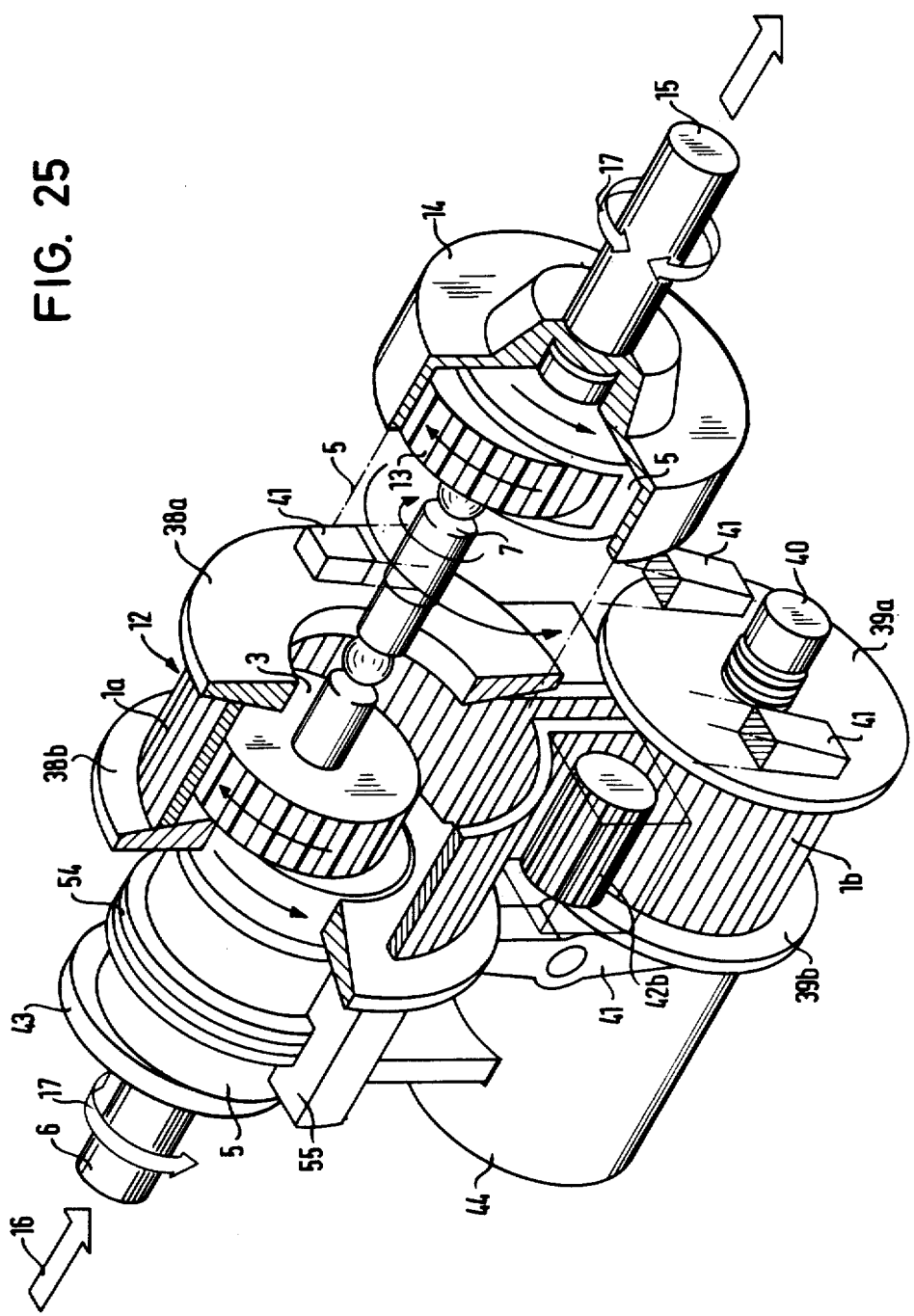
FIG. 25 is a perspective view of a multiple-gear rapid-start system in accordance with the invention and with a proportional control wheel.

Reference will now be made to FIGS. 2a–c which illustrate another embodiment of the gearing system. Its design is illustrated in FIG. 25. Similar or identical parts are labeled in the different figures with the same reference numbers.

In this drawing the scanner wheel 12 as a whole is indicated and there is not only a scanner wheel 3 on cardan shaft 7 but also a fixed synchronic wheel 13. Synchronic wheel 13 revolves like a planet wheel around a differential wheel 14 in the form of a ring gear. The shaft 15 of differential wheel 14 is the side gear of the gearing system. Cardan shaft 7 rotates freely on pinion cage 5.

Synchronic wheel 13 and differential wheel 14 allow positive-zero-negative shifting, represented in FIGS. 2a–c in an inside-revolution version.

FIG. 2a shows the gearing system in the zero state. Control wheel 12 has the same number of teeth as differential wheel 14 and scanner wheel 3 the same number as synchronic wheel 13. The unrolling ratio between scanner wheel 3 and control wheel 12 is thus the same as that between synchronic wheel 13 and differential wheel 14. The powered pinion cage 5 is allowed to idle. The transmission ratio is 1:0 and no power can be transmitted. Differential wheel 14 is fixed because it is synchronic with fixed control wheel 12.

FIG. 2b shows a state with a positive direction of revolution. Control wheel 12 has fewer teeth than differential wheel 14. If power is now applied to pinion cage 5 to move scanner wheel 3 around control wheel 12, synchronic wheel 13 will be rotated less than in the idling state, whereby differential wheel 14 will rotate in the powering direction. The system will be positively geared down.

FIG. 2c shows a state with a negative direction of revolution. Control wheel 12 has more teeth than differential wheel 14, meaning that synchronic wheel will be rotated more than in the idling state, so that differential wheel 14 will rotate counter to the powering direction. Arrow 16 indicates the initial rotation and arrows 17 the (positive or negative) sense of rotation.

Figure 3A:
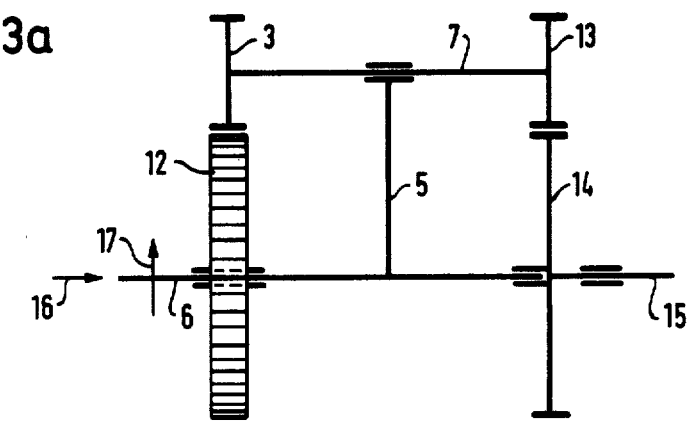
FIG. 3a–c is a schematic representation of a third embodiment at various states of rotation.
Figure 3B:
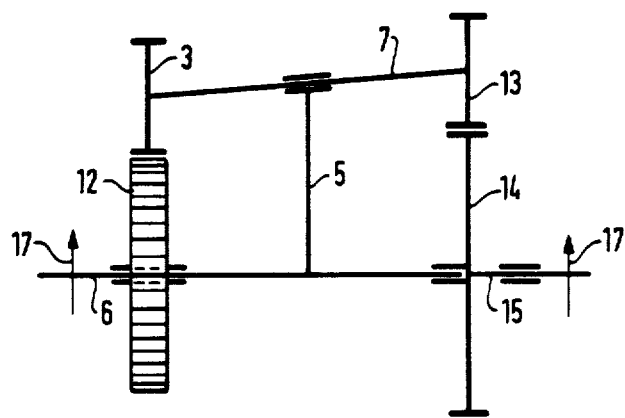
Figure 3C:
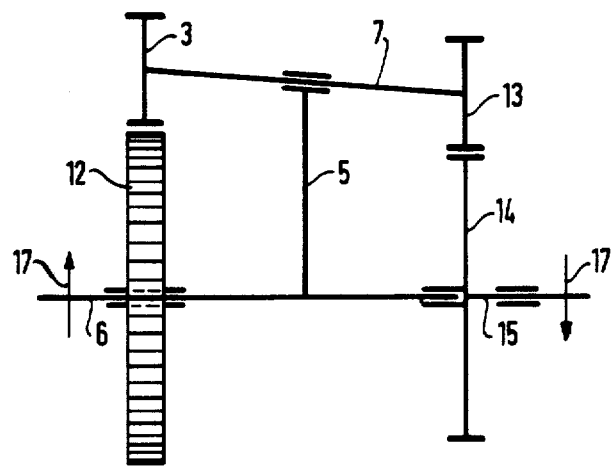

The embodiment of the gearing system illustrated in FIGS. 3a–c differs from that illustrated in FIGS. 2a–c in that it is an outside-revolution system in which control wheel 2 and differential wheel 14 are sun wheels. Otherwise what has been stated with reference to 2a–c holds true for this version as well.

If the scanner wheel 3 and synchronic wheel 13 illustrated in FIGS. 2a through 3c have different numbers of teeth, the transmission ratio will be shifted. Thus, when the tooth ratios are odd, positive-negative systems can be carried out without a neutral.

Figure 4:
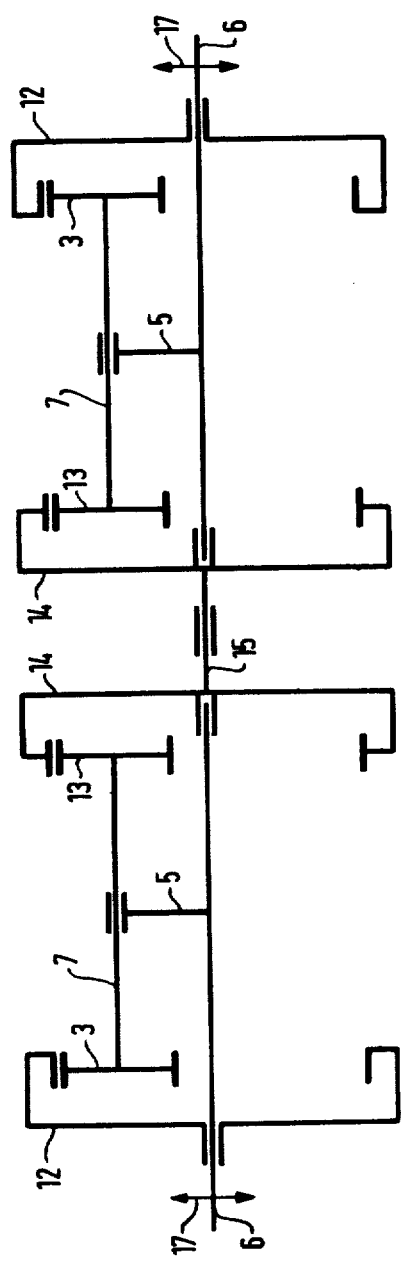
FIG. 4 is a schematic representation of two embodiments of the type illustrated in FIG. 2 mounted in series.

Combining such gearing systems allows a great variety of mixed-switching arrangements. FIG. 4 shows one example in which two systems of the type illustrated in FIGS. 2a–c are mounted in series with their two differential wheels 14 mounted so as to rotate together on shaft 15. This results, for the transmission ratios of 1:0:0:1 in question, in an idling state in which the two shafts 6 can rotate independently, which corresponds to an unclutched state, although no clutch is present. These systems can be designed as either interior-revolution or exterior-revolution systems as well as rotating-cone or rotating-plate systems with the correct toothing selection. Combinations of these systems are also possible.

The control wheel can not only be closed but also open, as illustrated in FIGS. 5, 12, 13, and 26, in which the effective meshing area 18 of the control wheel is an arc of a circle, preferably a semicircle, as will be especially evident from FIG. 5. This requires at least two synchronized scanner wheels 19 that will always engage the effective meshing area 18 one at a time. In this case both scanner wheels 19 are mounted on pinion cage 20. The previously mentioned sychronicity of scanner wheel 19 results directly in embodiments that have a differential wheel (cf. FIGS. 24 & 26). Since only one scanner wheel at a time always engages meshing area 18 the efficiency of systems with open control wheels is just as high as that of systems with closed control wheels. The arrows in FIG. 5 show the context of movement.

As illustrated in FIG. 6a, b, systems with open control wheels can also be designed so that shifting will be independent of the setting of the scanner wheels or independent of time limit. This can be achieved in particular by spring loading the tooth setting of the scanner wheels 19 synchronically with that of the control wheel, which in this case is represented by effective meshing area 18.

To achieve this spring loading each scanner wheel 19 is divided into a hub 21 and a toothed rim 22 that can be mutually displaced by an interval corresponding to the width of one tooth. Toothed rim 22 is spring loaded in the sense 23 of rotation and against the sense 24 of rotation of scanner wheel 19. During shifting and while scanner wheel 19 is outside effective meshing area 18, a control cam, not shown, advances toothed rim 22 synchronically with the section of teeth that is entering area 18. This advance is represented in FIG. 6 by the displacement between the two triangles 26 between 6a and 6b. Immediately after meshing, toothed rim 22 is forced into its locked position as shown in FIG. 6b. The transmission ratio between FIGS. 6a and 6b corresponds to one in which complete tooth 26, which is inside meshing area 18, would be resting against toothed semicircle dividing line 27, as is the case with tooth 26 in FIG. 5. Dividing line 27 defines the beginning and end of effective meshing area 18.

When scanner wheel 19 is connected for example by a secondary scanner wheel 28 to synchronic wheel 12 as will be specified later with reference to FIG. 24, spring loading can be carried out as will now be specified with reference to FIGS. 7a, b.

In this case the teeth are spring-loaded by allowing secondary scanner wheel 28, which is below scanner wheel 19, to oscillate (cf. arrow 29). Once scanner wheel 19 has engaged meshing area 18, secondary scanner wheel 28 will spring back into its base position as shown in FIG. 7a. Since secondary scanner wheel 28 rests against cardan shaft 7 (cf. also FIG. 24), the synchronity between the two scanner wheels 19 will not be disrupted by the oscillation.

If the system is designed so that the tooth setting of one of the two scanner wheels 19 can be displaced by half a tooth synchronically to the tooth setting of meshing area 18, of the control wheel in other words, the resulting half-tooth steps will permit twice the number of gear states. Instead of displacing one of the two scanner wheels 19 by half a tooth, both scanner wheels 19 can be displaced by a quarter tooth.

Figure 7C:
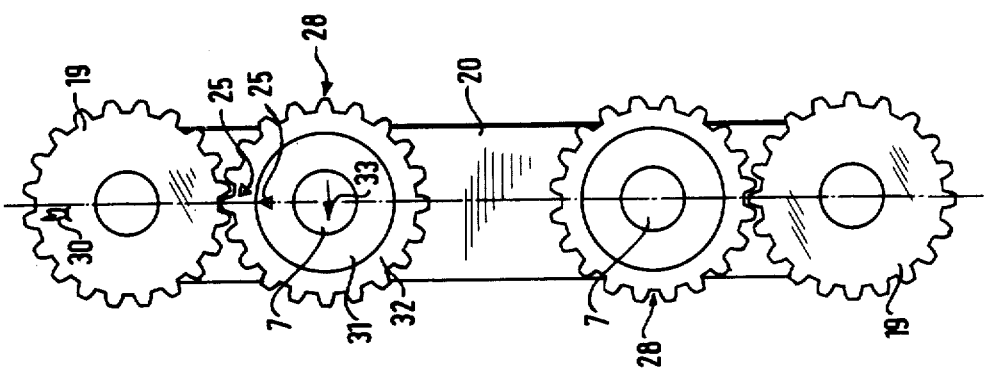
FIG. 7a–c illustrates the resilient adjustment, half-tooth adjustment, and continuously synchronized setting of the scanner wheels when secondary scanner wheels are employed, with a and b illustrating resilient and half-tooth adjustment and a through c continuous synchronization.
Figure 7B:
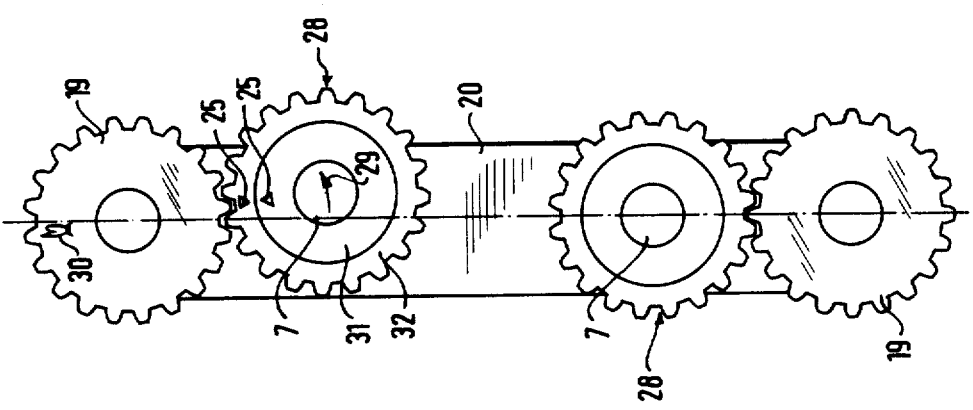
Figure 7A:
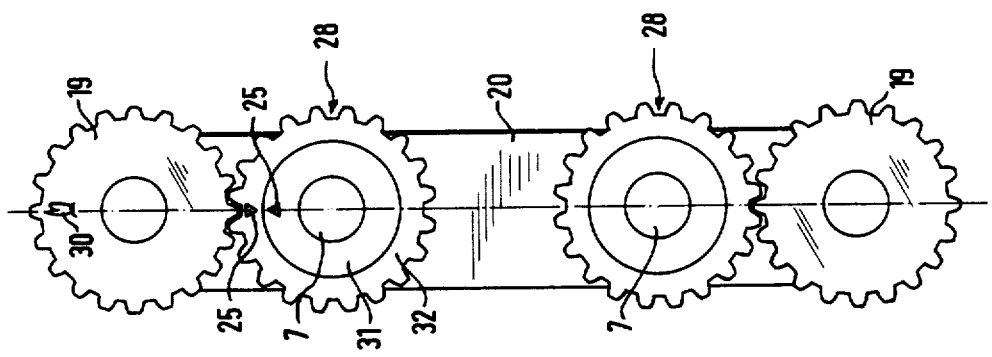

This can be done in the embodiment illustrated in FIGS. 7a, b by allowing secondary scanner wheel 28 to swing out far enough to displace scanner wheel 19 one half tooth (cf. mark 30 in FIGS. 7a, b).

Instead of oscillating displacement, this half-tooth shift can also be produced by a definable rotational displacement between hub 21 and toothed rim 22 as shown in FIGS. 6a, b.

The scanner wheel will always be displaced by half a tooth when a half tooth is simultaneously introduced into or removed from the effective meshing area, which has a full number of teeth. If for example meshing area was 25 teeth, this corresponds to a complete circle of 50 teeth. If a half tooth is added, one of the scanner wheels will simultaneously be displaced by half a tooth as just described. The 25½ teeth that are now available correspond to a full circle of 51 teeth. If another half tooth is now added the half-tooth displacement of the scanner wheel will be cancelled.

Finally, it is possible to make the tooth setting of scanner wheels 19 continuously synchronizable synchronically to the tooth setting of the control wheel or to meshing area 18. This results in a continuously variable gear system, in which, by the way, shifting is subject to no temporal limitations. Two embodiments of such synchronization will now be specified with reference to FIGS. 6a through 7c. Note that these types of synchronization have nothing to do with the spring loading and half-tooth displacement just specified with reference to FIGS. 6a through 7b.

Such continuous synchronization can be accomplished with an oscillating scanner system like that illustrated in FIGS. 7a–c if secondary scanner wheels 28 have a hub 31 and a toothed rim 32 that are mutually displaceable by rotation and that are connected by an idler or magnetic clutch. Adjustment will occur when scanner wheel 19 is outside meshing area 18 when secondary scanner wheel 28 oscillates as shown in FIG. 7b to bring scanner wheel 19 into the necessary tooth setting and then returns immediately as the result of idling or uncoupling of the magnetic clutch into its base position as shown in FIG. 7c. The oscillation is indicated by arrows 29 and 33, while the mutual displacement of hub 31 and cogged rim 32 is indicated by triangles 25 and the displacement of scanner wheel 19 by marks 30.

Such an adjustment is also possible as illustrated in FIGS. 6a, 24, and 26 when an idling function or magnetic clutch of the type specified with reference to FIGS. 7a–c is provided between the tooth scanning of scanner wheel 19 and the tooth scanning of synchronic wheel 13. This function is provided for example as illustrated in FIG. 6a between hub 21 and cogged rim 22, although it can also be provided for example between two sections of cardan shaft 7 or between cardan shaft 7 and synchronic wheel 13.

Adjustment can also be controlled strictly electronically instead of with a cam. When continuously variable embodiments are automated, the controls must be planned so that the full tooth settings will predominate over the intermediate tooth settings in relation to a longer delay in a particular gear position.

Figure 8:
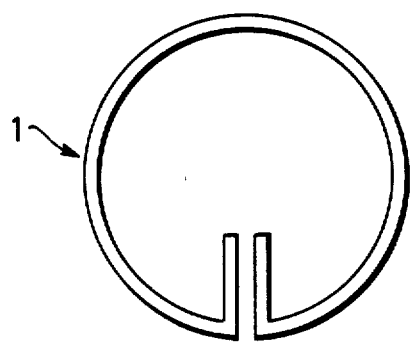
FIG. 8 is a schematic representation of one embodiment of a control wheel that circles its associated scanner wheel externally.
Figure 9:
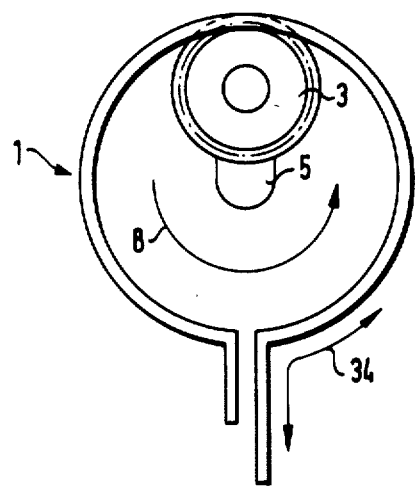
FIG. 9 illustrates a control wheel that circles its associated scanner wheel internally, with the link chain introduced and removed from the same side.

Technically, there are many ways of designing digital gearing systems. FIGS. 8 through 14 illustrate various embodiments of guides for link chain or link band 1. FIG. 8 shows a guide for an exterior-revolution control wheel and FIG. 9 a guide for an interior-revolution control wheel with monochain guidance. Arrow 8 indicates the sense of rotation of the control wheel and double-headed arrow 34 the senses in which the links are introduced and removed.

Figure 10:
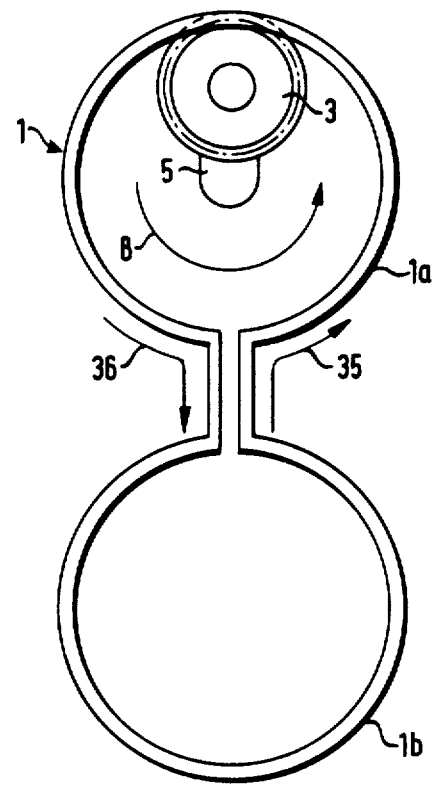
FIG. 10 shows a proportional control wheel that circles inside the scanner wheel, FIG. 11 a control wheel that can circle either inside or outside the scanner wheel, FIG. 12 an open control wheel with two scanner wheels and with the links being introduced and removed from one side, FIG. 13 an open control wheel with link-circulation introduction and removal, FIG. 14a, b is a representation of the control wheel in FIG. 13 in two operating positions, illustrating as well the tensioning jaws of the associated tensioning device and their direction of motion.
Figures 15, 15A:
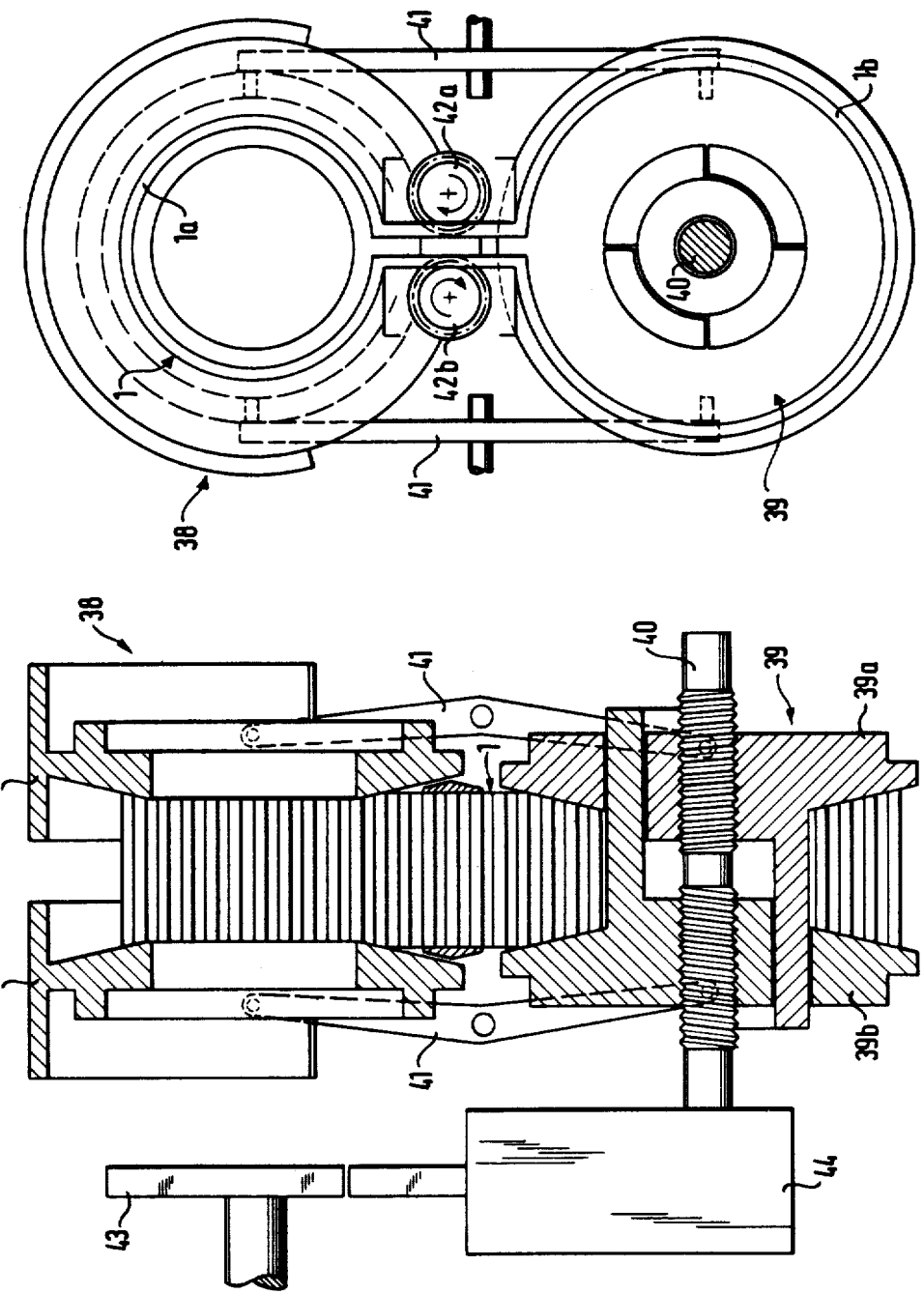
FIG. 15 is a front view and FIG. 15a is a side view of a preferred technical embodiment of a proportional control wheel.

FIG. 10 illustrates a rotating chain guide for a proportional control wheel. With a proportional control wheel, which is also illustrated in FIGS. 15 and 25, link chain or link belt 1 is imposed over opposing tensioning jaws, which are specified later, in the form of a double circle. In this case the length of the chain in one of the two circles will always increase by the same amount that of the chain in the other circle decreases and vice versa. With the rotating chain guide, a closed link chain 1 (this term will now be uses for the sake of brevity to cover a link belt as well) is introduced in the sense 8 in which pinion cage 5 rotates (cf. arrow 35) and removed from the other side (cf. arrow 36). This requires no force opposite to the sense of rotation for shifting back.

Figure 11:
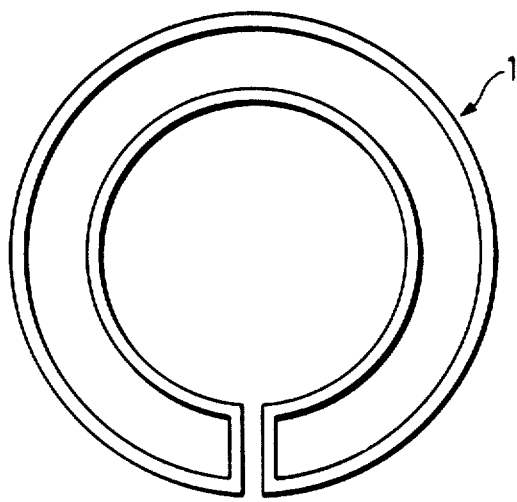

FIG. 11 shows a nested proportional chain guide. It can be use for both interior and exterior rotation and can be designed to function as a monochain guide or rotating-chain guide.

Figure 12:
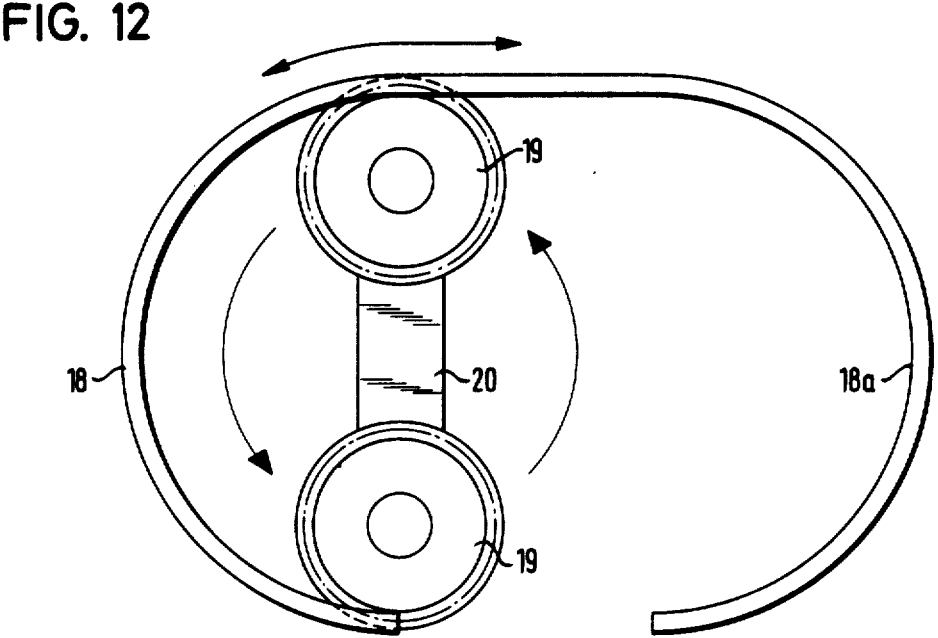
Figure 13:
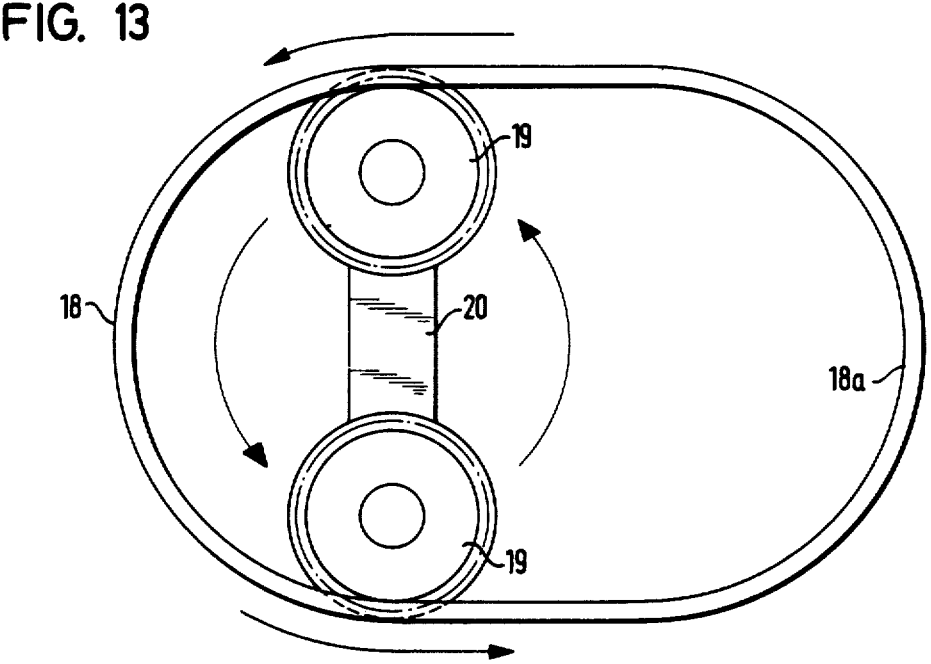
Figure 14A:
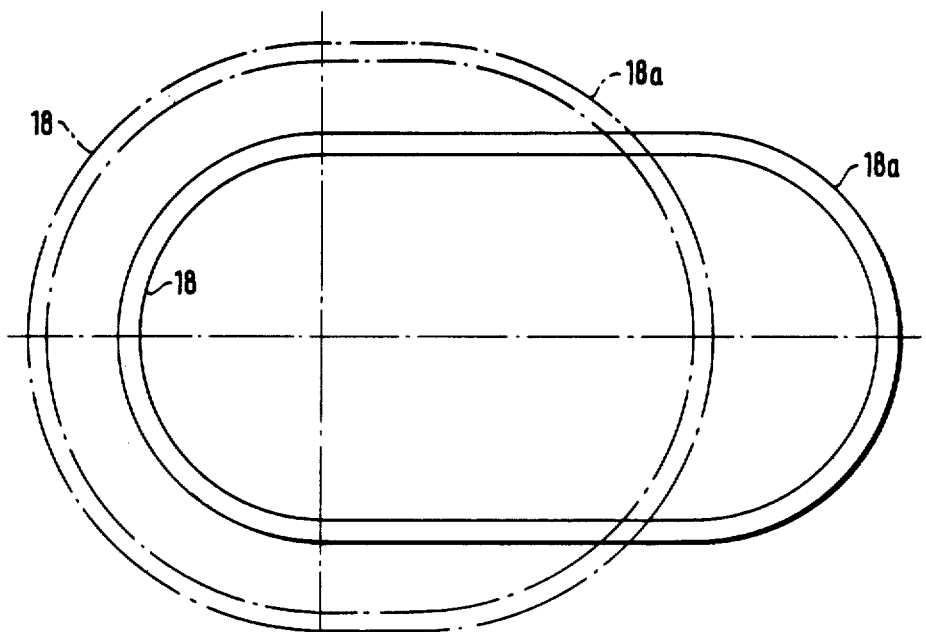
Figure 14B:
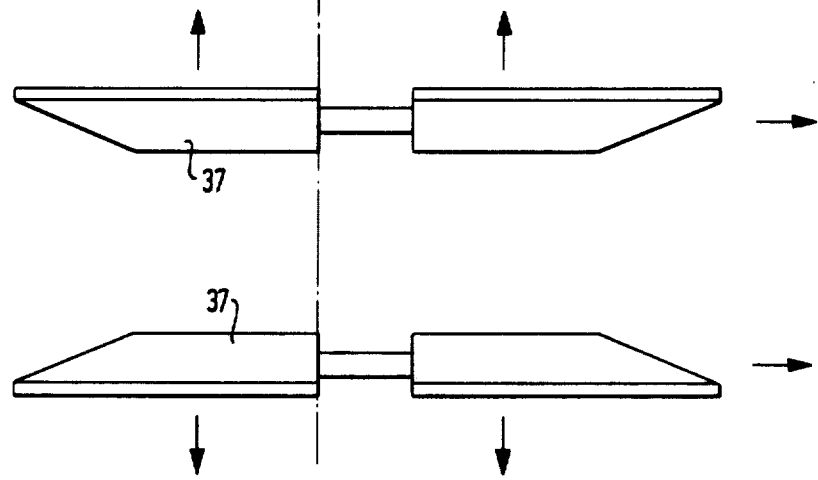

FIG. 12 shows a monochain guide for open control wheels and FIG. 13 a rotating chain guide for open control wheels, with 18a the section of link chain outside effective meshing area 18. In FIG. 14a the whole link chain 18, 18a is illustrated into two different tension states produced by tensioning jaws 37, which are shown in FIG. 14b for the expanded control wheel. The arrows indicate the direction in which jaws 37 move to make the wheel smaller.

FIG. 15, and 15a shows one technical embodiment of a proportional control wheel with a rotating-chain guide. Link chain 1 is continuous and is mounted over a countertensioning device 39 that rotates in a sense opposite to, but synchronically with, tensioning device 38. When tensioning jaws 39a and 39b on countertensioning device 39 are displaced by right-and-left threaded spindle 40, displacement arms 41 will move tensioning jaws 38a and 38b on tensioning device 38 in the opposite direction. Thus, when threaded spindle 40 is adjusted, the dimensions of circular chain section 1a and 1b will alter inversely. If the upper circle 1a increases, lower circle 1b will decrease, and vice versa. Two toothed wheels of gears 42a and 42b between tensioning device 38 and countertensioning device 39, which idle in such a way that link chain 1 can move only in the sense of rotation of the pinion cage, ensure the chain-rotation function. A control cam 43 on the pinion cage determines the instant of shifting through a switching servo 44.

Proportional control wheels can also be constructed with monochain guidance.

Figure 16:
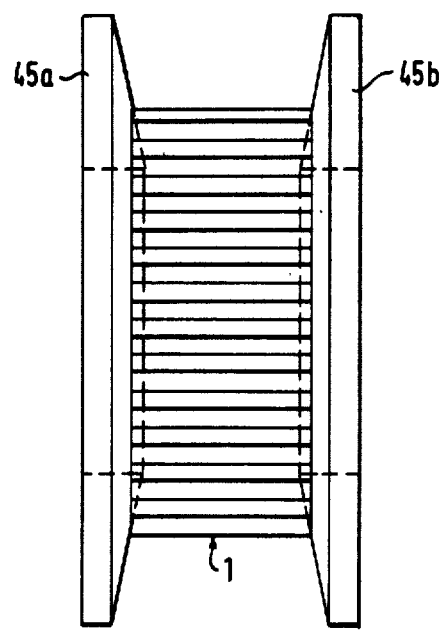
FIGS. 16 through 19 show various embodiments of tensioning devices.
Figure 17:
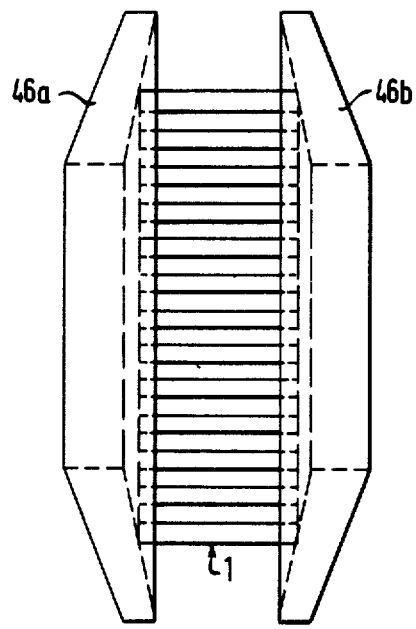

FIGS. 16 through 19 illustrate various types of tensioning jaws for tensioning link chain 1. FIG. 16 shows the pair of tensioning link chain 1. FIG. 16 shows the pair of tensioning jaws 45a and 45b of the tapered-disk type commonly and preferably employed with link chain 1 between them. FIG. 17 shows concave tensioning jaws 46a and 46b, a type that increases the elasticity of link chain 1 during exterior rotation and decreases it during interior rotation.

Figure 18:
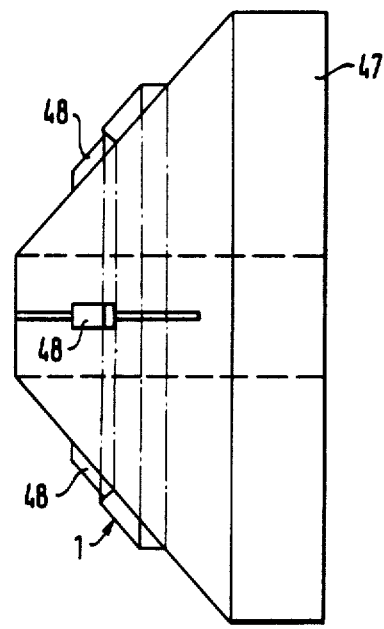
Figure 19:
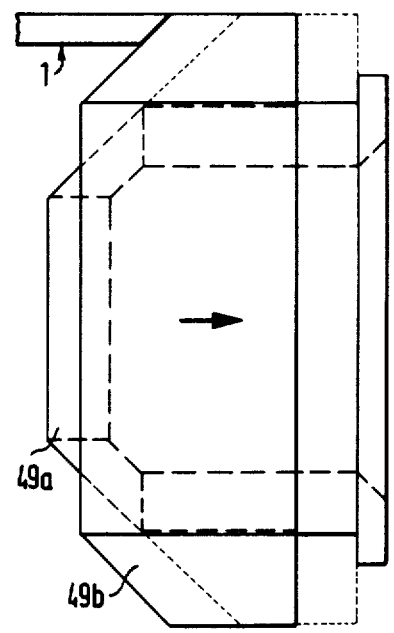

FIG. 18 shows a single-piece tensioning jaw 47 for conical, plate, or exterior-rotation control wheels. The tapering surface of this single-piece jaw has adjustable chain holders 48 to retain link chain 1. FIG. 19 shows a telescopic tensioning jaw that consists of two parts 49a and 49b, one of which slides into and out of the other (cf. arrow). When the number of gearing states is large, necessitating a long jaw stroke, such a telescopic jaw will allow narrow link chains to be employed. Similar jaws, which moves, however, in the opposite direction, can be designed for use with nested proportional chain guides of the type illustrated in FIG. 11.

Figure 20:
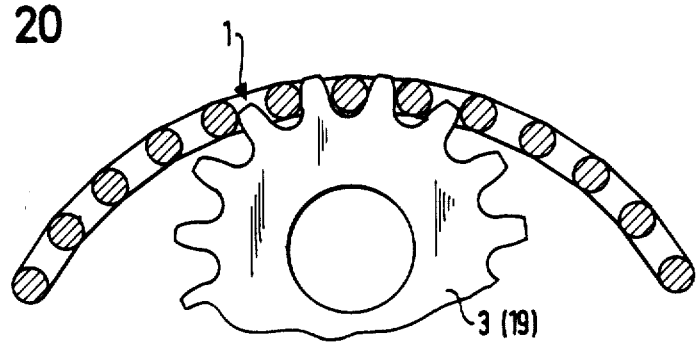
FIGS. 20 through 22 show various embodiments of the link chain or link belt, FIGS. 23a, b show an embodiment of the gearing system in accordance with the invention in which a synchronic wheel also functions as a secondary scanning wheel and the differential wheel as a sun wheel.
Figure 21:
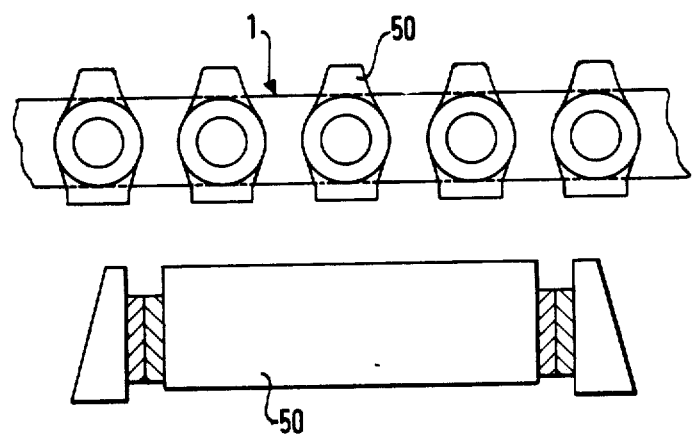
Figure 22:
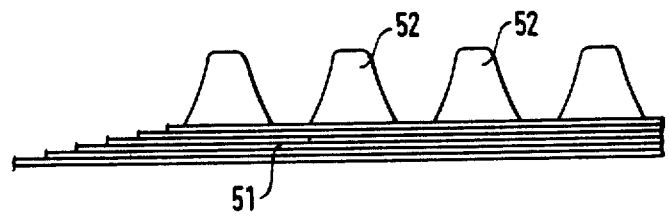

FIGS. 20 through 22 illustrate various embodiments of link chain or link belt 1. If what is called pinwheel toothing, in which point toothing meshes with cycloid toothing, is employed for a nonpositive connection between link chain 1 and scanner wheel 3 or 19, a pin or roller chain 1 of the type shown in FIG. 20 should be employed for the link chain. If on the other hand what is called evolent toothing or the like is employed to achieve a nonpositive connection, a chain 1 with the tooth-like pins 50 shown in FIG. 21 should be employed as a control chain. A mean value should then be selected for the tooth profile. Since the link chain in this case will have a certain amount of elasticity, the scanner wheel will more or less automatically slide down positively, which means that the control wheel will adjust to the meshing of the scanner wheel.

Strips 51 of several layers of steel to which teeth 52 have been applied, like that illustrated in FIG. 22, can also be used with open control wheels.

The link-chain systems being specified can also be constructed to some extent with helical, double-helical, or herringbone toothing. Link chains with teeth specially designed to fit the geometries of various embodiments can also be employed. Thus, chains with semiconical teeth can be provided for conical-rotation embodiments.

FIG. 23a, b shows an embodiment of the gearing system in which synchronic wheel 53 also functions as a secondary scanner wheel, with the differential wheel in the form of a sun gear. FIG. 23a shows a version in which scanner wheel 12 has a short diameter and 23b one in which it has a long diameter. Whereas scanner wheel 3 can be radially displaced, synchronic wheel 53 oscillates in such a way as to remain constantly in contact with scanner wheel 3 and differential wheel 14.

FIG. 24 shows an embodiment for open control wheels at maximum expansion or with a large effective meshing area 18. This embodiment differs from that illustrated in FIG. 23a, b in that the secondary scanner wheel 28 and the synchronic wheel 13 are separate gears connected by a cardan shaft 7. For other details see the text referring to FIG. 7a–c.

FIG. 25 shows a technical embodiment of a multiple-gear, rapid-shift system with a proportional control wheel. This system is a simple speed-reduction system with forward-neutral-reverse shifting. In the essentials of its design this embodiment corresponds to that shown in FIG. 2a–c, with the control wheel designed as in FIG. 15. Nonpositive meshing is obtained through only two pairs of gears, control wheel 12 and scanner wheel 3, on the one hand and synchronic wheel 13 and differential wheel 14 on the other. Gears 3 and 12 through 14 always remain in fixed contact, in contrast to ordinary shifting systems. No matter whether the system is running in forward, neutral, or reverse, scanner wheel 3 and synchronic wheel 13 will basically always rotate in the same sense. The sense in which pinion cage 5, the only part of which that is illustrated is that located between scanner wheel 3 and synchronic wheel 13, will also therefore remain the same because it is in one piece with the driveshaft. Only differential wheel 14 will change its sense of revolution in accordance with the gearing state.

Shifting occurs through a switching servo 44 (cf. also FIG. 15), with the instant of shifting being established by control cam 43. When a shifting instruction is provided to servo 44, control cam 43 will regulate the shifting procedure with respect to time and position. Such a control cam 43 can also carry out the shifting procedure directly in systems that do not run too fast and have an intermediate clutch as a shifting release.

On pinion cage 5 there is a horizontally displaceable, bilaterally active ball-thrust bearing 54 that operates in conjunction with interior mechanisms that are not illustrated to govern the elevation of scanner wheel 3. Bearing 54 is displaced by an arm 55 that is connected to rear tensioning jaw 38b (cf. FIG. 15). Reference is made to FIG. 15 with respect to the idling mechanism. The arrows without reference numbers in FIG. 25 indicate the directions of rotation and revolution of the various components. Finally, it should be noted that the embodiment illustrated in FIG. 25 can naturally also be designed with a chain guide of a type, like that in FIG. 9, for example, other than the proportional chain guide illustrated.

FIG. 26 shows a technical embodiment of a digital gearing system with an open control wheel as a speed-reduction system for forward-neutral-reverse shifting. This embodiment corresponds in principle to that illustrated in FIGS. 5 through 6b and 13. The gears rotate on the same system as that of a closed control wheel as illustrated in FIG. 25. The middle of pinion cage 20 is not referenced in this figure because this component can also be constructed either as a simple multiple-gear rapid-shift system as in FIG. 5 or with time-independent and rotation-sense-independent shifting, with spring-loaded scanners in other words, with a scanner wheel 19 that can be displaced a half tooth to double the number of gear states, or even as a strictly continuously variable system of the type specified above with reference to FIG. 6a, b.

The control of the digital systems will now be specified. These are very simple because such system shift without a clutch and require only a few control instructions, while shifting is automatic in the preferred embodiments.

Thus, strictly mechanical controls will require only a simple, pivoting lever that works in the opposite direction to activate the plus or minus shifting function of the system. A signal for the particular gear state can be read off the control wheel.

Figure 27:
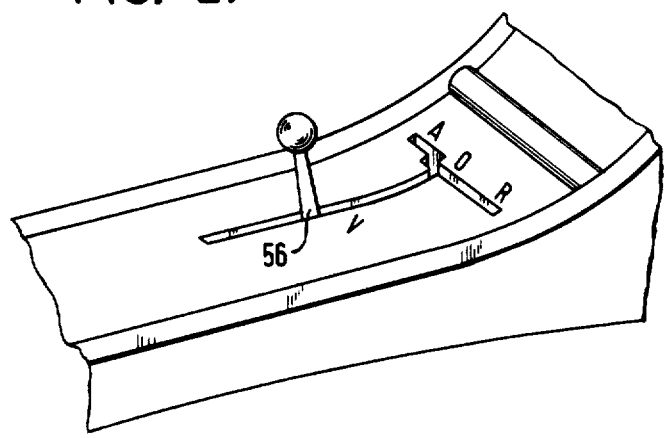
FIG. 27 illustrates an activating lever employed to shift a system in accordance with the invention manually or automatically.

An expanded embodiment is illustrated in FIG. 27. A shift lever 56 provides a specific gear position, which the digital gearing system then follows automatically until it arrives at the desired value. V indicates forward, R reverse, O neutral, and A the uncoupled or idling state. With respect to idling see FIG. 4 and with respect to the uncoupled state FIG. 32.

Multiple-gear rapid-shift systems, although they do shift without a clutch, have in their simpler embodiments no idling function on the output side. It is therefore essentil to provide vehicles with nonpositive-meshing interruption for shifting operations. In their simplest form, this can be carried out by means of a jaw clutch, by displacing the differential pinion, or with a magnetic clutch of the type specified with reference to FIG. 6a through 7c.

As will already be evident from the control and shifting functions, the present power-transmission system has been conceived above all for automatic controls, and also mainly for electronic controls, especially for applications involving microprocessor technology to obtain maximum control and operating precision as well as genuine and practical complete automation.

In the automatic converters that prevail at the present time automatic shifting is governed by load. This results in the reverse deceleration phenomenon discussed in the introduction, in which, when gas is removed to reduce driving speed, such an automatic device shifts up as a result of the low load instead of into a lower gear.

Figure 28:
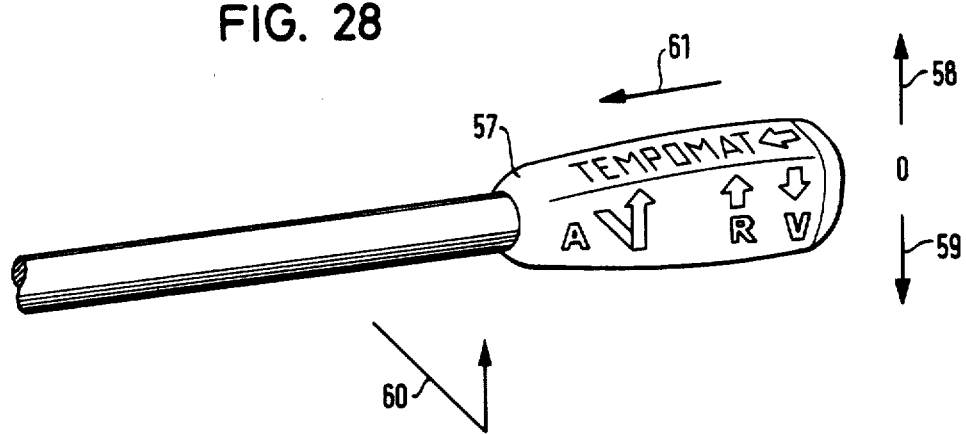
FIG. 28 illustrates another type of activating lever employed for the fully automatic shifting of a system in accordance with the invention.
Figure 29:
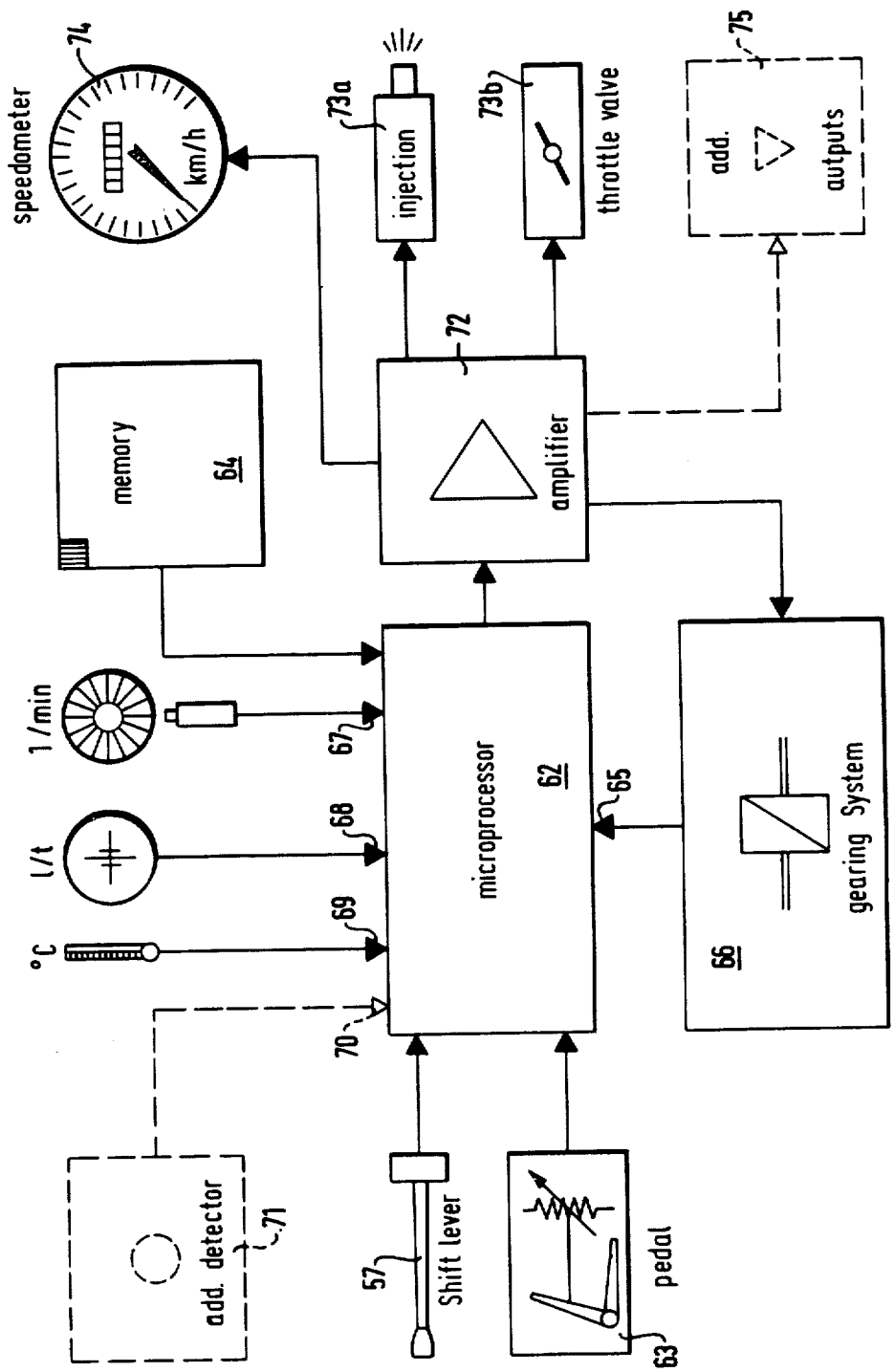
FIG. 29 is a block circuit diagram of computerized fully automatic controls for a gearing system in accordance with the invention.

FIG. 29 shows a block switching diagram of a preferred type of electronic controls for a computerized digital system with a fully automatic function for altering the power-transmission ratio. These electronic controls can be shifted by means of a operating device, preferably a shift lever 57, to forward, neutral or reverse. FIG. 28 illustrates the function of shift lever 57. In the rest state, the device is set at neutral, O. Lifting lever 57 shifts the device into reverse (cf. arrow 58) and depressing it (arrow 59) into the forward gears. Lifting and advancing the lever simultaneously in the direction indicated by arrow 60 deactivates the device. Axially inclining it (arrow 61) activates an automatic speed control to maintain constant speed.

Reference is made once again to block diagram 29, the heart of which is a microprocessor with inputs from shift lever 57, from accelerator pedal 63, and from a memory 64 that contains data for the engine and gearing system, and detector inputs 65 for the state of the digital gearing system, 67 for the engine rpm, 68 for fuel consumption, and 69 for operating temperature, and if necessary inputs 70 for one or more additional detectors 71. Microprocessor 62 has outputs through an amplifier 72 to control the digital gearing system 66, fuel injection 73a, throttle valve 74b, and speedometer 74. Other control outputs 75, for a fuel-consumption indicator for example, are indicated in broken lines.

As will be evident from this diagram, the computer controls govern not only the digital gearing system 66 but also the engine.

The engine responds directly to accelerator pedal 63 only in neutral. When a direction of travel has been selected the accelerator pedal will function as a nominal-speed indicator and simultaneously as an acceleration or engine-brake control. Each position of accelerator pedal 63 corresponds to a particular nominal speed. The difference between nominal and actual speeds determines the intensity of acceleration or braking. When the accelerator pedal is at rest its nominal value corresponds to the neutral gear. The driving wheels are fixed. Thus, the brakes will not usually be necessary for start-ups or upgrades, even on steep roads. When the accelerator pedal is activated the computer will control acceleration while taking into consideration the most economical relationships between engine and gearing until the predetermined nominal speed has been attained at the most economical gear state.

If the accelerator pedal is released to decrease speed, the computer will take over deceleration in exactly the same way. Expressed in simpler terms, this means that the faster the acceleration or deceleration the more the accelerator-pedal difference will increase toward the actual value. Thus, this automated system does not, as in ordinary systems, shift up when descending a grade or when braking, but immediately down. Thus the vehicle is as easy to operate as if it had no gearing or constantly variable electric power.

The capacity of the computer to utilize fuel as economically as possible consists in principle in that it used its stored data on the one hand to detect the maximal potential for exploiting performance and on the other the data obtained from its instrumentation to detect the operating state and thus basically "knows" whether and how to alter its controls to optimize performance economics. Thus, shifting into the ideal gear is already occurring while changes in demands on performance are showing up.

The speed-related and mutually determined control of engine and gearing prevents jerky shifting, even at maximum shifting rates, which can amount to hundredths of a second per gear state in motor vehicles, because engine performance is adjusted by changing fuel supply and immediately readjusted at the instant of shifting. This results in a completely continuous characteristic with no losses.

Since this control system governs not only the gearing but also the engine, it is very simple to integrate other control functions like constant-speed maintenance (tempomat) or cylinder or engine uncoupling.

The constant-speed maintenance system that is generally called tempomat will require only a memory function to store the speed value and a button function that can be activated from a shift lever like that in FIG. 28. Uncoupling functions can be activated through the controls that are already present, with the accelerator pedal or brake-light contact. The expense, which is hardly worth mentioning since it must be less than 3% of the extra costs that prevail today, can not prevent such functions from being integrated as standard.

Figure 30:
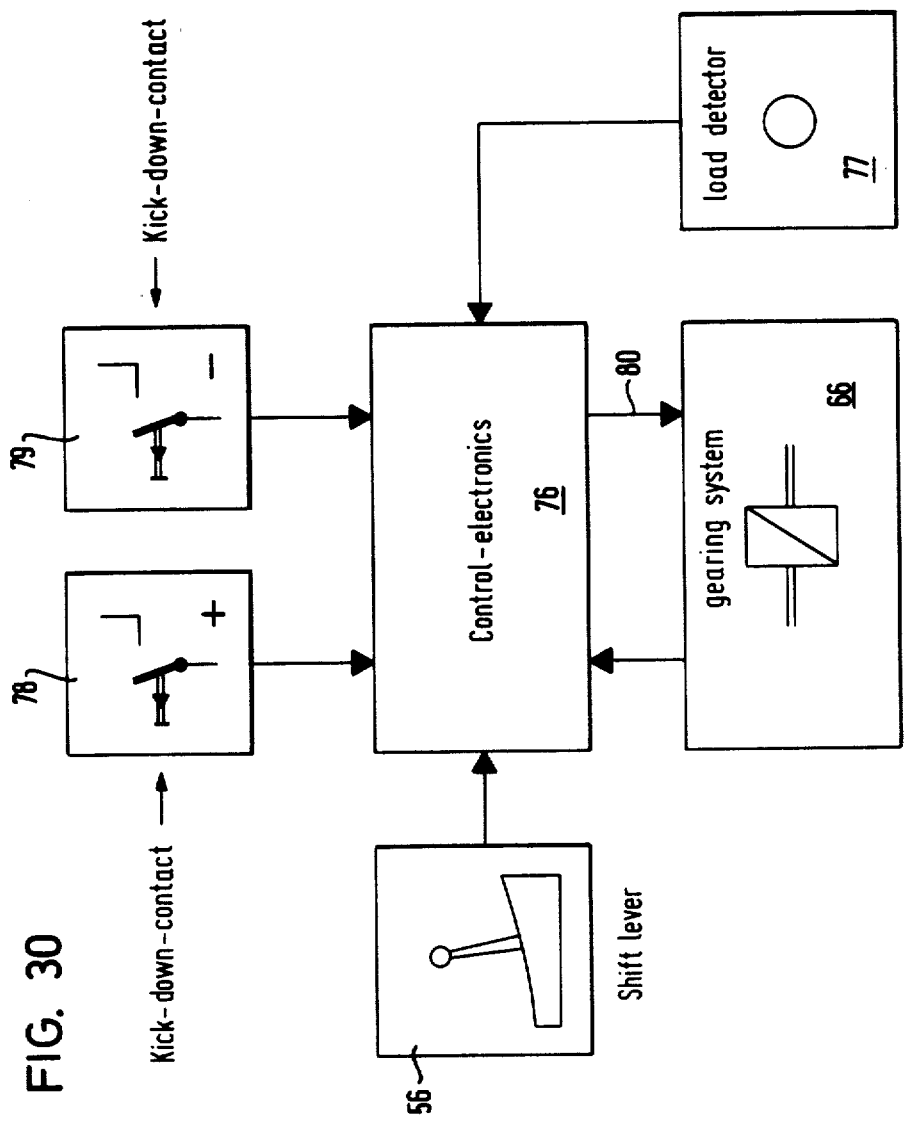
FIG. 30 is a block circuit diagram of semiautomatic controls for a gearing system in accordance with the invention.

FIG. 30 is a block circuit diagram of a semiautomatic electronic control system. The automated performance of this system is similar to that of an ordinary automatic converter. Control electronics 76 have an input for an operating lever 56 as in FIG. 27, a detector input for the position of digital gearing system 66, detector input for an rpm and load detector 77 (cf. FIG. 31), an input detector for an activating contact for a kick-down 78, a detector input for an activating contact for the kickdown function 79 on the brake pedal, and an output 80 for controlling the digital gearing system 66.

Figure 31:
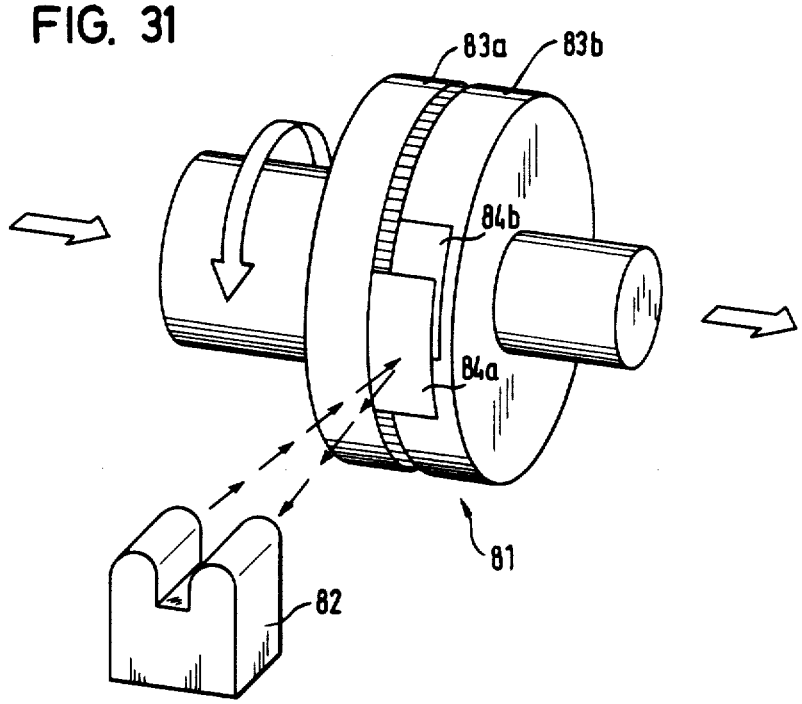
FIG. 31 shows a torsionally elastic connection with rpm and load detectors.

Rpm and load detector 77 is shown in FIG. 31. It consists of a torsionally elastic connection 81 in conjunction with a stationary detector 82 that can be in the form of a reflected-light barrier (as illustrated) or induction pickup. This torsionally elastic connection 81 is mounted in series with digital gearing system 66 to produce a front-to-back ratio.

There is a detector element 84a on one of the two parts 83a and 83b, which can be torsion-elastically displaced toward each other and another detector element 84b on the other. These two detector elements 84a and 84b overlap each other along the periphery of parts 83a and 83b and are in the form of reflective surfaces in this particular version. Load is measured from the length of the pulses in measuring device 82 as the reflecting surface formed from the two detector elements 84a and 84b varies with load. Rpm is measured from the number of pulses per unit of time, with one pulse corresponding to one revolution.

The operating lever in FIG. 27 corresponds in function to that in the mechanical design specified above, but serves to control the electronic controls.

The position of operating lever 56 predetermines the maximum extent to which digital gearing system should be geared up. If the brake pedal is activated out of the neutral position while a gear position is being inserted, this activation of the downshift function will block the gearing system controls. Only after the braking function has been released can the system be controlled.

The electronics govern digital system 66 with reference to load and performance as a result of the load and rpm values obtained from rpm and load detector 77. As load increases the digital system shifts down, as it decreases it shifts up, and to the greatest extent possible until a predetermined gear state is achieved.

When the brake pedal is activated, digital gearing system 66 shifts down at fixed intervals. A gear state can be fixed in an underload state of course only through operating lever 56. The kick-down function works on the familiar system. The uncoupling function for the disk system is of the type specified for the mechanical embodiment.

When digital systems with a low number of gear states are employed at high rpm's the jerky shifting that then becomes possible can be absorbed by an electromagnetically opening clutch. The nonpositive meshing of the coupling can be dosed by electromagnetic opening of the electronic controls during the shifting process.

Figure 32:
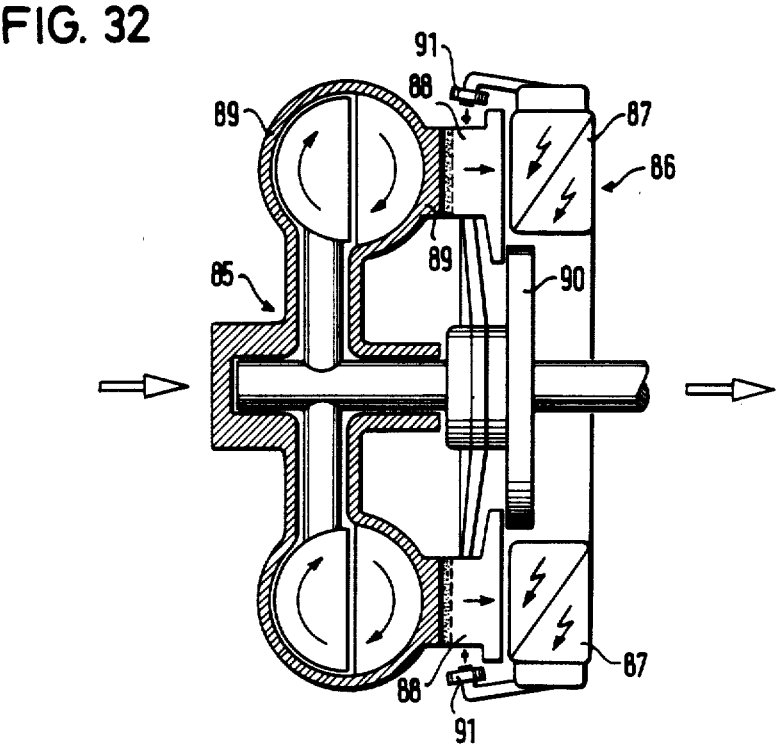
FIG. 32 shows a hydraulic-electric clutch.

Such an expanded embodiment, which is mainly for difficult startup conditions, is illustrated in FIG. 32. The digital system is mounted in series with a hydrodynamic clutch 85 that can also be designed as a torque converter. This hydrodynamic clutch 85 or torque converter is activated by an electromagnetic clutch 86 essentially only during the shifting process. When electromagnet 87 is off there is a strong transfer of force. When electromagnet 87 lifts thrust plate 88 from converter housing 89, the hydrodynamic clutch 85 or torque converter will operate. This will prevent losses of the type that occur with hydrodynamic power transmission, while the work done by the converter system as such would not be necessary. For plate operation, electromagnet 87 is activated briefly and, after thrust plate 88 has been lifted all the way up to clutch stop 90, hold-back rollers 91 snap in so that electromagnet 87 does not always have to remain on.

Such an electromagnetic-hydraulic clutch of the type illustrated in FIG. 32 is especially appropriate when designed as a torque converter, even independent of digital gearing systems, for starting machines that are very difficult to start as well as to improve the efficiency of ordinary automatic converters.

The digital gearing system in accordance wih the invention has the following special advantages.

Almost any number of gear states can be selected, with their cost being very slight, because one chain link more or less is all that is required per state. This permits embodiments with very many gear states and hence wide transmission ranges, so that an ideal gear state will be available for every operating condition.

The large number of gear states permits a smooth characteristic, even in connection with first-class brake performance and, above all, the advantages of gear acceleration.

The large number of gear states permits on the one hand very large transmissions, which allow a very high starting torque, which above all prevents the wheels from racing, and on the other hand very small transmissions, with which low rpm's can be utilized in what is called savings gears.

Gear-system acceleration permits the maximal amount of engine performance to be converted into acceleration, because the engine can run at full throttle right from the beginning of the acceleration process, and this maximal performance can be applied completely to the wheels by systematically shifting up from the lower to the higher gear states. Furthermore it also permits in a similar way the rpm's to be kept within the most economical range at low acceleration outputs.

Conventional shifting systems do not permit gear-system acceleration because such acceleration occurs along with the engine, at rpm intervals, which means that the effective mean output available for acceleration will remain considerably below maximal engine performance. Furthermore, conventional shift systems, in contrast to the shift system in accordance with the invention, can not utilize the ideal output range because adjustment is too low. Although torque converters and friction systems can do so to a certain extent, the resulting advantages are nullified by the inherent losses.

The neutral gear made possible by the gearing system in accordance with the invention generally eliminates the necessity of brakes when starting and slowing down, even on steep roads. It also eliminates the need for hand or emergency brakes because the drive wheels are fixed in the neutral gear state.

Since a digital gearing system is also, as already mentioned, a cogwheel system that can be shifted without a clutch, it will have very little friction, which provides excellent efficiency.

The control properties of the system in accordance with the invention allow extremely simple control no matter how many gear states by means of plus or minus pulses and permit the system to be shifted in minium time without a clutch. Even the reverse gears do not have to be shifted separately.

The potential for simple automation, which is especially practical with microprocessors, yields genuine fully automatic function accompanied by ease of operation and by precise control with respect to performance utilization and consumption that can not be compared with previously known so-called fully automatic systems.

It also yields fuel savings, directly, indirectly, and from the point of view of engine design.
(a) Direct fuel savings result from the rapid automatic control of the gearing system in a transmission ratio that is most practical for every situtation. The engine will thus consume basically only as much fuel as will be minimally necessary for each driving condition. This will result in fuel savings of 10-20%.
(b) Indirect fuel savings result from the exploitation of full performance, especially within the framework of gear-system acceleration, which means that less powerful and hence more economical engines can be employed because of the better acceleration factors that can be obtained with the system in accordance with the invention.

EXAMPLE

A VW Rabbit 51-kW automatic transmission has an average output of about 39 kW available for acceleration. It consumes about 11 liters per 100 km.

A VW Rabbit D 40 kW that had been equipped with an automated digital gearing system in accordance with the invention also had an output of about 39 kW available for acceleration but consumed only about 5.5 liters per 100 km.

Since worldwide speed limits mean that the choice of motor size is no longer decisively determined by peak speed but rather by acceleration and flexibility, the practical results of this economy may under certain conditions amount, as the above example demonstrates, to as much as 50%.
(c) Fuel savings from the aspect of engine design results to the extent that engine flexibility can be neglected to the advantage of the lowest possible fuel comsumption.

Another considerable advantage of the invention is its beneficial environmental impact, especially because its lower exhaust emissions mean up to 80% less asbestos dust and increased driving safety, as will be evident from the following table.
(1) Lower exhaust emissions result from

| (a) | lower fuel consumption and better fuel utilization, | } less carbon monoxide and hydrocarbons |
|---|---|---|
| (b) | precise mixing and combustion from electronic engine control, | |
| (c) | optimal load adustment through ideal gear state. | |

(During underload there is a higher level of pollutants as the result of excessive fuel consumption, whereas during overload there is an increased concentration of pollutants as the result of incomplete fuel combustion.)
(2) As much as 80% less asbestos dust.
Brake linings are, as is known, made of asbestos, and their abrasion product is carcinogenic. The abrasion that occurs in the gear system in accordance with the invention is very low because the maximum utilization of the engine-brake effect means that the brakes must be activated very seldom.
(3) Increase driving safety as the result of
(a) improved brake performance (as the result of engine braking),
(b) ease of operation (which permits the driver to concentrate more on traffic conditions), and
(c) encouraging the trend to build cars with lower peak speeds.

Note in this context that the dominant pollutants from gasoline engines are carbon monoxide, hydrocarbons, nitrogen monoxides, lead, and aromatics, while those from diesel engines tend to be soot, nitrogen monoxides, aromatics, sulfur dioxide, hydrocarbons, and carbon monoxide.

The fuel savings achieved, along with various cost-reducing factors like the potential for employing less powerful motors, lower brake use, etc. makes the economy achieved on the whole with a computerized system in accordance with the invention basically much higher than the acquisition price of such a system.

A system in accordance with the invention can be employed to great advantage not only in motor-vehicle engineering, but also in the greatest variety of fields. It is for example possible to achieve high levels of energy savings with heavy diesel locomotives by employing a device in accordance with the invention, and in conjunction of course with an electrohydraulic converter, instead of the conventional electric torque converter normally used to start them. This will result not only in energy savings but also in much lower manufacturing costs.

I claim:

1. Clutchless variable tooth gearing with links to be tensioned by a double-sided tapered-disc tensioning device in a selectively full or partial circle of variable diameter ring gear engageable with at least one scanner wheel with control means being provided for controlling introduction as well as removal of links into and from said circle, each link being held at the same distance from the center of said circle.

2. The gearing according to claim 1 wherein an intermediate wheel having teeth on the inner as well as on the outer side thereof is arranged between said variable diameter ring gear and said scanner wheel, said intermediate wheel securing a steady power connection between said variable diameter ring gear and said scanner wheel while, on variation of said ring gear, the axis of said intermediate wheel being pivotable around the axis of said scanner wheel.

3. The gearing according to claim 1, wherein the links in said variable diameter ring gear are provided in an endless closed arrangement and run over a counter-tensioning device that operates synchronically with and proportional to the tensioning device but in an opposite sense to said tensioning device, with said links being introduced into and removed from the effective tensioning radius in the same sense as the scanner wheel rotates.

4. The gearing according to claim 1 wherein an effective meshing sector of said variable diameter ring gear is an arc of a circle and wherein several synchronously rotating scanner wheels are provided so that they always mesh one at a time with the effective meshing sector.

5. The gearing according to claim 4, wherein the tooth setting of the scanner wheels can be varied synchronically under spring loading with the tooth setting of said variable diameter ring gear so that introduction and removal of links into and from the effective tensioning radius may be effected irrespective of the rotational position of the scanner wheels.

6. The gearing according to claim 4, wherein the tooth setting of the scanner wheels can be varied synchronically with the tooth setting of the variable diameter ring gear by an interval equal to half the width of a tooth so that the number of speeds is doubled.

7. The gearing according to claim 4, wherein the tooth setting of the scanner wheels can be continuously synchronized with the tooth setting of said variable diameter ring gear so as to effect absolutely stepless variation of the transmission ratio.

8. The gearing according to claim 1, wherein, as control means, there are provided electronic control means for varying the power transmission ratio of said variable gear, said means having a fully automatic function in that by means of an operating element, preferably a shift lever, a switch or key, the moving direction of a vehicle driven by said gear may be programmed to neutral, forward and reverse, with the accelerator pedal serving as a nominal speed setting means via an electronic circuit in the electronic control means during forward and backward movement and, thus, as a control for acceleration and motor braking as well as for stop and start operations while directly acting on the motor when the vehicle is in neutral.

9. The gearing according to claim 8, wherein said electronic control means comprise a micro-processor and a memory, with said micro-processor preferably comparing operative data to given memory data so as to approach in each case the ideal transmission ratio of said variable gear, switching said variable gear back and forth until the operative data are substantially consistent with the respective memory value.

10. The gearing according to claim 1, which, to absorb shocks or jolts, is arranged in series with a torsionally elastic connection which, together in cooperation with a stationary measuring device, serves as a speed and load setting means.

11. The gearing according to claim 1, which is arranged in series with a hydrodynamic clutch or torque converter which is substantially activated during the starting operation for shock-absorbing purposes by means of an electromagnetic or hydraulic clutch or is constantly activated by changing the connections when the vehicle is to be pushed.

* * * * *